(12) United States Patent
Aronson

(10) Patent No.: US 10,708,271 B2
(45) Date of Patent: Jul. 7, 2020

(54) SCALABLE CONFIGURABLE UNIVERSAL FULL SPECTRUM CYBERSPACE IDENTITY VERIFICATION TEST

(71) Applicant: Jeffry David Aronson, San Antonio, TX (US)

(72) Inventor: Jeffry David Aronson, San Antonio, TX (US)

( * ) Notice: Subject to any disclaimer, the term of this patent is extended or adjusted under 35 U.S.C. 154(b) by 0 days.

(21) Appl. No.: 16/583,257

(22) Filed: Sep. 26, 2019

(65) Prior Publication Data

US 2020/0028851 A1 Jan. 23, 2020

Related U.S. Application Data

(63) Continuation-in-part of application No. 15/456,542, filed on Mar. 12, 2017, now Pat. No. 10,462,139,
(Continued)

(51) Int. Cl.
*H04L 29/06* (2006.01)
*G06Q 10/10* (2012.01)
(Continued)

(52) U.S. Cl.
CPC .............. *H04L 63/10* (2013.01); *G06F 21/32* (2013.01); *G06F 21/40* (2013.01); *G06Q 10/10* (2013.01)

(58) Field of Classification Search
CPC ......... H04L 63/10; G06F 21/32; G06F 21/40; G06Q 10/10
See application file for complete search history.

(56) References Cited

U.S. PATENT DOCUMENTS 7,278,025 B2 * 10/2007 Saito ...................... G06K 19/07
   713/185
7,796,013 B2 * 9/2010 Murakami ........... A61B 5/1171
   340/5.82
(Continued)

OTHER PUBLICATIONS

Wu et al., An Integrated Cyber Security Monitoring System Using Correlation-based Techniques, Jun. 2009, IEEE International Conference on System of Systems Engineering, pp. 1-6 (Year: 2009).*

*Primary Examiner* — Kenneth W Chang
(74) *Attorney, Agent, or Firm* — John A. Fortkort; Fortkort & Houston PC

(57) ABSTRACT

A scalable configurable universal full spectrum cyberspace identity verification test for determining whether or not one specific tested person if the same person as one specific known person. Utilizing cyber resources and predetermined criteria for making cyberspace identity verification test determinations regarding any one specific person who is a sensor observation subject, the cyberspace identity verification test makes cyberspace identity verification test determinations regarding any one specific tested person; makes cyberspace identity verification test determinations at any attainable level of accuracy, including 100% accuracy; makes single, intermittently performed, and constantly performed cyberspace identity verification test determinations; utilizes available cyber resources; interacts with itself or utilized cyber resources to perform possible functions; utilizes data representing recognized characteristics for comparing or determining; utilizes observation data, derived data, useful information or outcomes from comparing for making cyberspace identity verification test determinations; and, reports on any selected aspect of its operations at any time.

20 Claims, 3 Drawing Sheets

Related U.S. Application Data which is a continuation-in-part of application No. 15/071,075, filed on Mar. 15, 2016, now Pat. No. 9,635,025, which is a continuation-in-part of application No. 14/857,445, filed on Sep. 17, 2015, now Pat. No. 9,319,414, which is a continuation-in-part of application No. 14/316,196, filed on Jun. 26, 2014, now Pat. No. 9,166,981, which is a continuation of application No. 13/784,277, filed on Mar. 4, 2013, now Pat. No. 8,769,649, which is a continuation of application No. 13/688,925, filed on Nov. 29, 2012, now Pat. No. 8,434,136.

(51) Int. Cl.
*G06F 21/40* (2013.01)
*G06F 21/32* (2013.01)

(56) References Cited

U.S. PATENT DOCUMENTS

| | | | |
|---|---|---|---|
| 8,520,905 B2* | 8/2013 | Black | G06F 3/03545 |
| | | | 382/116 |
| 2006/0059557 A1* | 3/2006 | Markham | G08B 31/00 |
| | | | 726/22 |
| 2012/0072983 A1* | 3/2012 | McCusker | H04L 63/126 |
| | | | 726/22 |

* cited by examiner

SCALABLE CONFIGURABLE UNIVERSAL FULL SPECTRUM CYBERSPACE IDENTITY VERIFICATION TEST

CROSS REFERENCE TO RELATED APPLICATIONS

This application is a continuation-in-part application of U.S. patent application Ser. No. 15/456,542, filed Mar. 12, 2017, entitled SCALABLE UNIVERSAL FULL SPECTRUM CYBER DETERMINING PROCESS, having the same inventor, now allowed, which is incorporated herein by reference in its entirety; which application is a continuation-in-part application of U.S. patent application Ser. No. 15/071,075, filed Mar. 15, 2016, issued as U.S. Pat. No. 9,635,025 on Apr. 25, 2017, entitled SCALABLE UNIVERSAL FULL SPECTRUM CYBER DETERMINING MACHINE, having the same inventor, which is incorporated herein by reference in its entirety; which application is a continuation-in-part application of U.S. patent application Ser. No. 14/857,445, filed Sep. 17, 2015, issued as U.S. Pat. No. 9,319,414 on Apr. 19, 2016, entitled SCALABLE FULL SPECTRUM CYBER DETERMINATION PROCESS, having the same inventor, which is incorporated herein by reference in its entirety; which application is a continuation-in-part application of U.S. patent application Ser. No. 14/316,196, filed Jun. 26, 2014, issued as U.S. Pat. No. 9,166,981 on Oct. 20, 2015, entitled FULL SPECTRUM CYBER IDENTIFICATION DETERMINATION PROCESS, having the same inventor, which is incorporated herein by reference in its entirety; which application is a continuation of U.S. patent application Ser. No. 13/784,277, filed Mar. 4, 2013, issued as U.S. Pat. No. 8,769,649 on Jul. 1, 2014, entitled FULL SPECTRUM CYBER IDENTIFICATION DETERMINATION PROCESS, having the same inventor, which is incorporated herein by reference in its entirety; which application is a continuation of U.S. patent application Ser. No. 13/688,925, filed Nov. 29, 2012, issued as U.S. Pat. No. 8,434,136 on Apr. 30, 2013, entitled FULL SPECTRUM CYBER IDENTIFICATION DETERMINATION PROCESS, having the same inventor, which is incorporated herein by reference in its entirety.

FIELD OF THE DISCLOSURE

The present disclosure relates generally to a scalable configurable universal full spectrum cyberspace identity verification test that utilizes a unique cyberspace identity verification test dataset for one specific known person to make at least one cyberspace identity verification test determination regarding any one specific tested person. The present disclosure more particularly relates to a file or files that contain data that represents the unique cyberspace identifiers for any one specific known person and a scalable configurable universal full spectrum cyberspace identity verification test that utilizes the unique cyberspace identifiers for one specific known person to test the identity of any one specific tested person, and it does so by means of utilizing at least one computing device, predetermined criteria, cyber resources and sensor data or derived data regarding the one specific known person and the one specific tested person. The any one specific known person may be selected from the group that consists of a full spectrum of people who have unique cyberspace identity verification test datasets, and the any one specific tested person may be selected from the group that consists of the full spectrum of people whose identities may be tested in cyberspace.

BACKGROUND OF THE DISCLOSURE

Cybersecurity is the protection of cyber resources, including the hardware, the software and the information stored in the hardware or software, from theft or malicious damage thereto. Cybersecurity typically entails controlling access to cyber resources in order to prevent malicious disruption or misdirection of the services or of the information those cyber resources provide.

Cybersecurity has become increasingly important as the world has become increasingly reliant on cyber resources. Moreover, with the advent of the Internet of Things (IoT), networks have become increasingly complex. Hence, in addition to various types of personal computers and smart phones, networks have come to include almost any device which can be embedded with electronics, programming, sensors and network connectivity. The increasing importance of cyber systems has made cybersecurity more critical, while the increasing complexity of cyber systems has made cybersecurity increasingly challenging. Together, these factors have made existing cybersecurity measures increasingly inadequate.

At the heart of most cybersecurity failures is the complete inability of computers and cyber resources to accurately determine the identity of any one specific person prior to allowing the any one specific person to gain access to cyber resources. Utilizing a cyberspace identity verification test for accurately determining a person's identity is an indispensable part of putting an end to the cybersecurity failures that now plague cyberspace. Accurately verifying any one specific person's identity is just one determination from a full spectrum of cyber determinations that may be provided by the scalable configurable universal full spectrum cyberspace identity verification test disclosed herein.

SUMMARY OF THE DISCLOSURE

In one aspect, a scalable configurable universal full spectrum cyberspace identity verification test is disclosed which comprises: utilizing (a) at least one computing device, (b) at least one sensor, (c) criteria selected from criteria that may be utilized by the cyberspace identity verification test, (d) selected useful information, (e) selected necessary programming, and (f) any other necessary resource, all of which being configured and utilized for cyberspace identity verification testing of any one specific tested person;

wherein the at least one cyberspace identity verification test is selected from the group consisting of a full spectrum of types of cyberspace identity verification tests that may be utilized for making a full spectrum of determinations regarding the verification of the cyberspace identity of any one specific tested person;

wherein any one specific tested person is selected from the group consisting of a full spectrum of people who could be tested;

wherein the any other necessary resources are selected from the group consisting of a full spectrum of other resources that may be necessary for the cyberspace identity verification test to utilize;

wherein the cyberspace identity verification test is utilizable under at least one set of identity verification test circumstances selected from the group consisting of a full spectrum of circumstances under which cyberspace identity verification tests may be performed;

wherein the cyberspace identity verification test is utilized for at least one purpose selected from the group consisting of a full spectrum of purposes for which cyberspace identity verification tests may be utilized;

wherein the necessary programming is selected from the group consisting of a full spectrum of programming that may be utilized by the cyberspace identity verification test;

wherein the cyberspace identity verification test utilizes useful information from at least one point in time or from over at least one period of time;

wherein the useful information is selected from the group consisting of a full spectrum of information that may be utilized by the cyberspace identity verification test;

wherein the full spectrum of useful information includes information that was from, or was derived from, at least one sensor observation;

wherein the at least one sensor observation provides useful information regarding at least one aspect of (a) the at least one sensor observation, (b) one specific known person, or (c) one specific tested person, the one specific known person or the one specific tested person being one specific subject of at least one sensor observation;

wherein at least one determination from at least one cyberspace identity verification test regarding one specific tested person is selected from the group consisting of a full spectrum of cyberspace identity verification test determinations regarding any one specific tested person;

wherein any one specific tested person is one specific subject of at least one sensor observation;

wherein at least one aspect of the one specific known person or the one specific tested person is selected from the group consisting of a full spectrum of sensor observable aspects of people who are subjects of sensor observations;

wherein the cyberspace identity verification test utilizes at least one observed characteristic regarding the at least one aspect of (a) the one specific known person, and (b) the one specific tested person;

wherein the at least one observed characteristic is selected from the group consisting of a full spectrum of sensor observable characteristics of people who are subjects of sensor observations;

wherein the cyberspace identity verification test utilizes at least one type of sensor observation selected from the group consisting of (a) visual sensor observations, (b) audible sensor observations, (c) thermal sensor observations, (d) olfactory sensor observations (e) tactile sensor observations, and (f) any other types of sensor observations that may be utilized by the cyberspace identity verification test;

wherein the at least one sensor observation has at least one characteristic that may be utilized by the cyberspace identity verification test, and wherein the at least one characteristic is selected from the group consisting of a full spectrum of characteristics of sensor observations that may be utilized by the cyberspace identity verification test;

wherein the cyberspace identity verification test utilizes necessary resources, and the cyberspace identity verification test is scalable in regard to included necessary resources, wherein included necessary resources fall at one point in a range of from a minimum to a maximum, wherein at the minimum the cyberspace identity verification test includes only the resources that are necessary for providing for the least complex, in regard to included necessary resources, of all cyberspace identity verification test needs for resources, and wherein at the maximum the cyberspace identity verification test includes all of the necessary resources for providing for the most complex, in regard to included necessary resources, of all cyberspace identity verification test needs for resources;

wherein the cyberspace identity verification test may be configured for determining or utilizing at least one measure of adequacy of available resources;

wherein the cyberspace identity verification test may be configured for determining or utilizing at least one measure of adequacy of available useful information;

wherein the cyberspace identity verification test may be configured for determining or utilizing at least one measure of accuracy of at least one cyberspace identity verification test determination;

wherein the cyberspace identity verification test makes at least one type of cyberspace identity verification test determination selected from the group consisting of (a) at least one single event cyberspace identity verification test determination regarding any one specific tested person, (b) at least one intermittently provided cyberspace identity verification test determination regarding any one specific tested person, and (c) at least one constantly provided cyberspace identity verification test determination regarding any one specific tested person;

wherein the cyberspace identity verification test is configurable for testing or verifying the cyberspace identity of any one specific tested person in real time or at any time thereafter;

and wherein the cyberspace identity verification test is further configurable for utilizing at least one part of at least one step selected from the group consisting of (a) a first series observation step wherein the cyberspace identity verification test utilizes at least one sensor observation, wherein one specific known person is one specific subject of the at least one sensor observation, wherein the one specific known person has at least one specific sensor observable aspect, wherein the cyberspace identity verification test recognizes at least one characteristic regarding the at least one specific aspect, wherein the at least one recognized characteristic is utilizable by the cyberspace identity verification test in making at least one cyberspace identity verification test determination regarding the one specific known person, wherein the cyberspace identity verification test utilizes at least one designation from the at least one sensor observation or assigns at least one designation representing (i) the at least one sensor observation, (ii) the at least one sensor observed aspect of the one specific known person, and (iii) the at least one sensor observed characteristic regarding the at least one specific observed aspect, wherein the cyberspace identity verification test includes the at least one designation, as data, in at least one first series observation record of the one specific known person, (b) a second series observation step wherein the cyberspace identity verification test utilizes at least one sensor observation, wherein one specific tested person is one specific subject of the at least one sensor observation, wherein the one specific tested person has at least one specific sensor observable aspect, wherein the cyberspace identity verification test recognizes at least one characteristic regarding the at least one specific aspect, wherein the at least one recognized characteristic is utilizable by the cyberspace identity verification test in making at least one cyberspace identity verification test determination regarding the one specific tested person, wherein the cyberspace identity verification test utilizes at least one designation from the at least one sensor observation or assigns at least one designation representing (i) the at least one sensor observation, (ii) the at least one sensor observed aspect of the one specific tested person, and (iii) the at least one characteristic regarding the at least one specific sensor observed aspect, wherein the cyberspace identity verification test includes at least one designation, as data, in at least one second series observation record of the one specific tested person, (c) a processing step wherein at least one part of the data representing at least one designation from at least one first series observation step or at least one second series observation step may be processed in at least one way, the at least one way is selected from the group consisting of a full spectrum of ways that data from first series observation steps or second series observation steps may be processed for utilization by the cyberspace identity verification test, wherein the processing of the observation data results in the creation of derived data, wherein observation data or derived data are utilizable for at least one purpose selected from the group consisting of a full spectrum of purposes that observation data or derived data may be utilized, wherein the at least one purpose includes the observation data or the derived data being utilized by the cyberspace identity verification test in making at least one selected cyberspace identity verification test determination regarding any one specific tested person, wherein at least one part of the observation data or the derived data may be utilized by the cyberspace identity verification test in at least one part of at least one step selected from the group consisting of at least one processing step, at least one matching step, at least one comparing step and at least one determining step, (d) a matching step wherein the cyberspace identity verification test matches observation data or derived data from at least one second series observation record of one specific tested person with comparable observation data or derived data from at least one first series observation record of one specific known person, (e) a comparing step wherein the cyberspace identity verification test compares observation data or derived data from at least one second series observation record of one specific tested person with comparable observation data or derived data from at least one first series observation record of one specific known person and provides at least one conclusion from the comparing, (f) a determining step wherein the cyberspace identity verification test utilizes at least one member selected from the group consisting of (i) at least one conclusion from at least one comparing step, (ii) at least one part of the observation data, (iii) at least one part of the derived data, and (iv) selected useful information, for making at least one cyberspace identity verification test determination, and (g) a reporting step wherein the cyberspace identity verification test provides at least one report regarding at least one part of at least one cycle of utilization of the cyberspace identity verification test.

In some embodiments of the foregoing cyberspace identity verification test, at least one part of the observation data or the derived data from at least one first series observation record of one specific known person may be utilized as the one specific known person's cyberspace identity, wherein the one specific known person's cyberspace identity is unique to the one specific known person, and at least one part of the observation data or the derived data from at least one first series observation record for any other one specific known person may be utilized as a cyberspace identity for the any other one specific known person, and wherein the cyberspace identity is unique to each one specific other known person.

In some embodiments of the foregoing cyberspace identity verification test, the cyberspace identity verification test achieves at least one selected attainable percentage of accuracy goal for at least one cyberspace identity verification test determination, wherein the at least one attainable percentage of accuracy goal falls within a range extending from 0% accuracy up to, and including, 100% accuracy.

In some embodiments of the foregoing cyberspace identity verification test, the cyberspace identity verification test is utilizable at any possible level of observation participation by any one specific tested person or any one specific known person, the any one specific tested person or the any one specific known person being one specific subject of the cyberspace identity verification test, and wherein the any possible level of observation participation ranges from the one specific tested person or the one specific known person being sensor observable but not being consciously or otherwise engaged in the at least one cyberspace identity verification test observation, to the one specific tested person or the one specific known person being an active participant or consciously engaged participant in the at least one cyberspace identity verification test observation.

In some embodiments of the foregoing cyberspace identity verification test, at least one sensor observation occurs over at least one period of time and the at least one sensor observation includes at least one observed change that occurs over the at least one period of time to at least one member selected from the group consisting of (a) at least one observable aspect of the sensor observation, (b) at least one observable aspect of any one specific known person who is one specific first series observation subject, and (c) at least one observable aspect of any one specific tested person who is one specific second series observation subject, wherein the cyberspace identity verification test is configurable for utilizing at least one part of the at least one observed change that occurs over the at least one period of time in making at least one cyberspace identity verification test determination.

In some embodiments of the foregoing cyberspace identity verification test, at least one observed change that occurs over at least one period of time includes at least one change to at least one observable aspect of at least one part of at least one feature of one specific person, wherein the at least one feature of the one specific person is selected from the group consisting of the one specific person's head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of any one specific person selected from the group consisting of a full spectrum of features of people where sensor observable changes occur.

In some embodiments of the foregoing cyberspace identity verification test, all or part of the observation data, or the derived data from (a) at least one first series observation record of one specific known person, or (b) at least one second series observation record of one specific tested person, may be included as a part of the useful information.

In some embodiments of the foregoing cyberspace identity verification test at least one cyberspace identity verification test determination includes a determination of any indicated percentage of probability that exists of one specific tested person who is the one specific subject of at least one cyberspace identity verification test observation being the same person as one specific known person, wherein the at least one cyberspace identity verification test determination ranges from determining that a 0% probability exists of the one specific tested subject of the cyberspace identity verification test being the one specific known person, through determining any intermediate indicated percentage of probability that exists of the one specific tested subject of the cyberspace identity verification test being the one specific known person, to determining there is a 100% probability that the one specific tested subject of the cyberspace identity verification test absolutely is the one specific known person.

In some embodiments of the foregoing cyberspace identity verification test, the cyberspace identity verification test further comprises a repeating step wherein the cyberspace identity verification test selects at least one part of at least one first series observation of one specific known person for repetition by one specific tested subject of the cyberspace identity verification test, wherein the one specific tested subject of the cyberspace identity verification test being sensor observed performing the at least one repetition, wherein the cyberspace identity verification test utilizes at least one designation from the repetition observation or assigns at least one designation representing (a) the at least one sensor observation, (b) the at least one repetition, (c) at least one observable aspect of the one specific tested subject of the cyberspace identity verification test, and (d) at least one characteristic regarding the at least one aspect of the one specific tested subject of the cyberspace identity verification test, wherein the cyberspace identity verification test includes at least one second series observation record of the one specific tested person's at least one repetition, and wherein the at least one second series observation record includes, as data, the at least one designation from the at least one observation or the at least one designation that was assigned by the cyberspace identity verification test to the one specific tested person's repetition.

In some embodiments of the foregoing cyberspace identity verification test, the cyberspace identity verification test comprises searching and utilizing available first series observation records of one specific known person until either every selected cyberspace identity verification test determination for the one specific tested person has been completed, or there are no further comparable first series observation records of the one specific known person to search or utilize.

In some embodiments of the foregoing cyberspace identity verification test, the cyberspace identity verification test utilizes useful information derived from at least one source other than from at least one member selected from the group consisting of (a) at least one first series observation record of any one specific known person, and (b) at least one second series observation record of any one specific tested person.

In some embodiments of the foregoing cyberspace identity verification test, the cyberspace identity verification test, at least one computing device, selected criteria, selected useful information, selected programming, and any other necessary resource are utilized for the purpose of making cyberspace identity verification test determinations that are utilized, at least in part, to determine whether to grant, or to deny, one specific tested person, who is the one specific tested subject of at least one cyberspace identity verification test observation, access to at least one part of at least one resource selected from the group consisting of (a) the cyberspace identity verification test, (b) at least one resource that is being utilized by the cyberspace identity verification test, and (c) at least one resource that is utilizing the cyberspace identity verification test.

In some embodiments of the foregoing cyberspace identity verification test, the cyberspace identity verification test manipulates, in any way possible, at least one operation of at least one member selected from the group consisting of (a) resources that are utilized by the cyberspace identity verification test, and (b) the cyberspace identity verification test itself; wherein the manipulating provides the cyberspace identity verification test with selection of possible utilizations, wherein the manipulating is utilized for at least one purpose, wherein the at least one purpose for utilizing the manipulating includes manipulating for the purpose of aiding in completing at least one selected cyberspace identity verification determination goal.

In some embodiments of the foregoing cyberspace identity verification test, the cyberspace identity verification test further includes cyberspace identity test history, wherein the history includes at least one history record from the cyberspace identity verification test.

In some embodiments of the foregoing cyberspace identity verification test, at least one part of at least one observation record for one specific known person that was derived from at least one source other than at least one first series observation step is included as at least one part of at least one first series observation record for the one specific known person.

In some embodiments of the foregoing cyberspace identity verification test, at least one part of at least one observation record for one specific tested person that was derived from at least one source other than at least one second series observation step is included as at least one part of at least one second series observation record for the one specific tested person.

In some embodiments of the foregoing cyberspace identity verification test, the operations of the cyberspace identity verification test, or any part thereof, may be performed in any useable order.

In some embodiments of the foregoing cyberspace identity verification test, the cyberspace identity verification test includes at least one standard cyberspace identity verification test designation representing at least one part of at least one aspect of at least one operation of the cyberspace identity verification test.

In another aspect, a scalable configurable universal full spectrum cyberspace identity verification test is provided which comprises: utilizing useful information from at least one point in time or over at least one period of time, the useful information being selected from a spectrum of information that includes at least one observed characteristic of one specific person who is one specific subject of at least one sensor observation, wherein the at least one sensor observation is a type of sensor observation selected from the group consisting of (a) visual sensor observations, (b) audible sensor observations, (c) thermal sensor observations, (d) olfactory sensor observations, (e) tactile sensor observations, and (e) any other type of sensor observations; wherein the cyberspace identity verification test provides at least one cyberspace identity verification test determination through the utilization of (a) at least one computing device, (b) criteria that may be utilized by the cyberspace identity verification test, (c) selected useful information, and (d) any necessary programming or resources; wherein the cyberspace identity verification test provides at least one duration of cyberspace identity verification test determination selected from the group consisting of (i) at least one single event cyberspace identity verification test determination that is made at one specific point in time, (ii) at least one set of intermittently made cyberspace identity verification test determinations, and (iii) at least one set of constantly provided cyberspace identity verification test determinations; wherein the at least one cyberspace identity verification test's determinations are utilized for at least one purpose; wherein the cyberspace identity verification test further comprises utilizing at least one part of at least one step selected from the group consisting of (a) a first series observation step utilizing at least one sensor observation, wherein at least specific known person who is one specific subject of the at least one sensor observation has at least one observable aspect, wherein the cyberspace identity verification test recognizes at least one characteristic regarding at least one observed aspect, wherein the at least one recognized characteristic is utilizable by the cyberspace identity verification test in making at least one selected cyberspace identity verification test determination, wherein the cyberspace identity verification test utilizes at least one designation from the at least one sensor observation or assigns at least one designation representing (i) the at least one sensor observation, (ii) the at least one observed aspect of the one specific known person who is one specific observation subject, and (iii) the at least one recognized characteristic, wherein the cyberspace identity verification test includes at least one of the designations, as data, in at least one first series observation record of the one specific known person, (b) a second series observation step utilizing at least one sensor observation, wherein one specific tested person who is one specific tested subject of the at least one sensor observation has at least one observable aspect, wherein the cyberspace identity verification test recognizes at least one characteristic regarding at least one observed aspect, the at least one recognized characteristic being utilizable by the cyberspace identity verification test in making at least one selected cyberspace identity verification test determination, wherein the cyberspace identity verification test utilizes at least one designation from the at least one sensor observation or assigns at least one designation representing (i) the at least one sensor observation, (ii) at least one observed aspect regarding the one specific tested person, and (iii) at least one characteristic regarding the at least one aspect, wherein the cyberspace identity verification test includes at least one of the designations, as data, in at least one second series observation record of the one specific tested person, (c) a processing step, wherein at least one designation from the at least one first series observation record or at least one designation from the at least one second series observation record is stored or utilized as data, wherein all or part of the observation data representing the at least one designation from the first series observation step or the second series observation step may be processed in at least one way, the at least one way is selected from the group consisting of a full spectrum of ways that observation data may be processed for utilization by the cyberspace identity verification test, wherein the processing of the observation data results in the creation of derived data, wherein the observation data or the derived data may be utilized for at least one purpose selected from the group consisting of a full spectrum of purposes that observation data or derived data may be utilized, wherein the at least one purpose includes being utilized by the cyberspace identity verification test in making at least one selected cyberspace identity verification determination, wherein at least one part of the observation data or the derived data may be included as at least one part of the useful information, and at least one part of the observation data or the derived data may be utilized by the cyberspace identity verification test during at least one part of at least one step selected from the group consisting of at least one processing step, at least one matching step, at least one comparing step and at least one determining step, (d) a matching step matching observation data or derived data regarding one specific tested person who is one specific tested subject of at least one second series observation with comparable observation data or derived data from at least one first series observation record of one specific known person, (e) a comparing step comparing observation data or derived data from at least one second series observation record of one specific tested person with observation data or derived data from at least one comparable first series observation record of one specific known person and providing at least one conclusion from the comparing, (f) a determining step, wherein the cyberspace identity verification test utilizes at least one member selected from the group consisting of (i) at least one conclusion from at least one comparing step, (ii) the observation data or the derived data from the first series observation records of one specific known person or the second series observation records of the one specific tested person, and (iii) useful information for making at least one cyberspace identity verification test determination, and (g) a reporting step providing at least one selected report regarding at least one part of at least one aspect of at least one part of at least one cycle of utilization of the cyberspace identity verification test.

DETAILED DESCRIPTION

Figure 1:
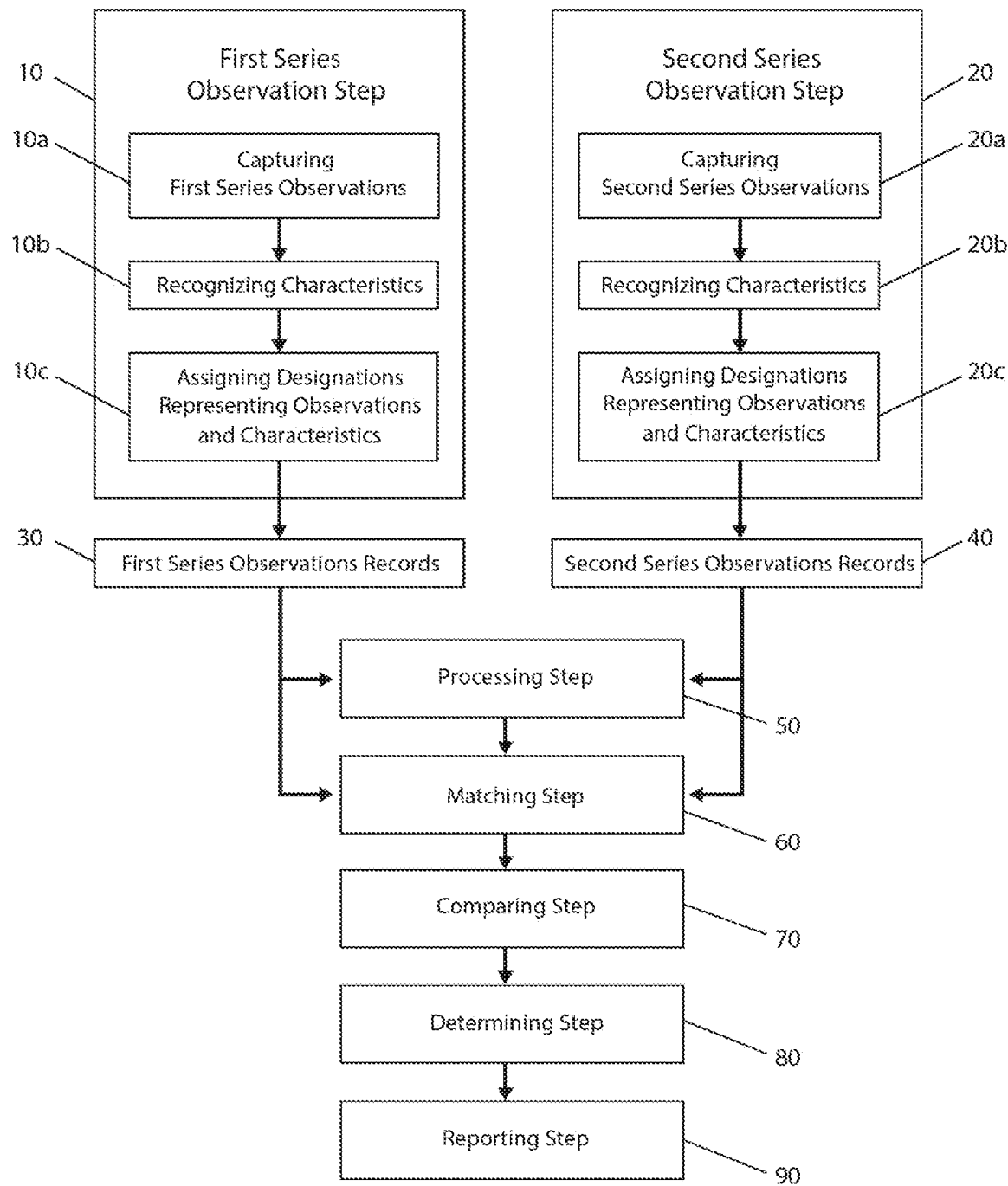
FIG. 1 is a flowchart which illustrates a particular, non-limiting embodiment of the operations of the cyberspace identity verification test disclosed herein.

We live in a technologically interconnected world where the vast spectrum of available cyber resources is ever widening. Over time, our technologically interconnected world appears to be destined to provide every possible cyber resource that humanity could ever want or need. Included in those cyber resources, and in accordance with the teachings herein, will be a scalable configurable universal full spectrum cyberspace identity verification test that will be capable of making the presently needed constantly provided 100% accurate cyberspace identity verification test determinations regarding any one specific person. A further discussion of this universal concept is disclosed in U.S. patent application Ser. No. 15/981,785, filed May 16, 2018, entitled "Scalable Configurable Universal Full Spectrum Cyber Process That Utilizes Measure Points From Sensor Observation-Derived Representations Or Analytically Rich Sparse Data Sets For Making Cyber Determinations Regarding Or Utilizing Sensor Observations Or Sensor Observations Subjects", now pending, having the same inventor, and which is incorporated herein by reference in its entirety; U.S. patent application Ser. No. 15/483,970, filed on Aug. 12, 2016, now pending, entitled "Scalable Configurable Universal Operating System", having the same inventor, and which is incorporated herein by reference in its entirety; which application is a continuation-in-part application of U.S. patent application Ser. No. 15/236,337, filed on Aug. 12, 2016, issued as U.S. Pat. No. 9,660,996 on May 23, 2017, entitled "Point-of-Cyber-Access Cyber System", having the same inventor, and which is incorporated herein by reference in its entirety; which application is a continuation-in-part application of U.S. patent application Ser. No. 14/447,283 filed on Jul. 30, 2014, issued as U.S. Pat. No. 9,479,507 on Oct. 25, 2016, entitled "Single-Point-of-Access Cyber System", having the same inventor, and which is incorporated herein by reference in its entirety; which application is a continuation application of U.S. patent application Ser. No. 13/702,537 filed on Oct. 19, 2011, issued as U.S. Pat. No. 8,832,794 on Sep. 9, 2014, entitled "Single-Point-of-Access Cyber System", having the same inventor, and which is incorporated herein by reference in its entirety.

In light of the foregoing, there presently is an unanswered need in the art for a cyberspace identity verification test that:

provides cyberspace identity verification test determinations regarding one specific known person and one specific tested person being the same person at any attainable level of accuracy, including 100% accuracy;

utilizes any number of observed characteristics of one specific known person or one specific tested person for making cyberspace identity verification test determinations regarding any one specific tested person;

utilizes observations of any one specific tested person who is not consciously engaged in a cyberspace identity verification test of the one specific tested person;

provides single event cyberspace identity verification test determinations regarding any one specific tested person, intermittently performed cyberspace identity verification test determinations regarding any one specific tested person, or constantly performed cyberspace identity verification test determinations regarding any one specific tested person;

utilizes observations where a tested person repeats a portion of a selected, previously captured sensor observation of a known person;

utilizes any available useful sensor observation for making cyberspace identity verification test determinations;

utilizes any number of observed characteristics of any one specific known person who is one specific subject of an observation, or any one specific tested person who is one specific subject of an observation, for making cyberspace identity verification test determinations;

provides and utilizes standard designations for accurately and consistently representing any aspect of the operations of the cyberspace identity verification test;

provides absolute security or privacy for any information or resources (a) that are utilized by the cyberspace identity verification test, and (b) that are utilizing the cyberspace identity verification test;

utilizes any useful criteria for observing, recognizing, matching, comparing, processing of observation data, processing of derived data, determining, reporting, or, any other aspect of making cyberspace identity verification test determinations;

utilizes observations made other than by the cyberspace identity verification test for making cyberspace identity verification test determinations;

utilizes useful information of any type from one or more sources for making cyberspace identity verification test determinations;

utilizes at least one recognized characteristic for making cyberspace identity verification test determinations;

utilizes comparisons of at least one matching characteristic to achieve a predetermined attainable cyberspace identity verification test determination goal; and is scalable in regard to included utilized necessary resources, to fall at any one point in a range of from a minimum to a maximum, wherein at the minimum the cyberspace identity verification test includes utilizing only the resources that are necessary for providing for the least complex (with respect to included utilized necessary resources) of all cyberspace identity verification test determination needs for necessary resources, and wherein at the maximum the cyberspace identity verification test includes utilization of all of the resource that are necessary for providing for the most complex of all cyberspace identity verification test needs for necessary resources.

A technologically interconnected world that is capable of providing every possible cyber resource humanity could ever want or need can only be built upon the foundation of a secure and safe cyberspace environment. Constant real time utilization of accurate and reliable cyberspace identity verification test determinations regarding any one specific tested person are an indispensable step in providing a secure and safe cyberspace environment and cyberspace ecosystem.

Therefore, there is a need in the art for a scalable configurable universal full spectrum cyberspace identity verification test that can be configured to constantly make 100% accurate determinations regarding the identity of any one specific person.

The foregoing needs, and other needs, may be met with the process, systems and methodologies disclosed herein.

DEFINITIONS

The following terms, as used in the present disclosure, have the meanings indicated.

Absolutely unique: occurring at a ratio of one to the total (non-zero) number of first series observation records.

Biological characteristic: any biological characteristic of one specific person that can be observed and reported upon.

Unique biological characteristic: any single observable biological characteristic of one specific person, or any combination of observable biological characteristics of one specific person (e.g., a biological fingerprint), that can be considered to be unique, or absolutely unique, to one specific observed person.

Capture/capturing: the use of cyber resources for acquiring and recording cyber sensor observations.

Characteristic: a recognized aspect regarding another aspect of an observation or observation subject that can be assigned at least one designation for further utilization.

Characteristics: at least one characteristic.

Constant/constantly: occurring at any selected frequency that provides for essentially continuous uninterrupted verification of the cyberspace identity of any one specific tested person.

Criteria: a group of options containing at least one member.

Cyber: utilizing non-biological processing or programming. Anything such as devices, programming, processes, or files that utilize non-biological processing of programming in any way.

Cyber Portal: an input/output device that is a component of a Single-Point-of-Access Cyber System or a Point-of-Cyber-Access Cyber System.

Derived data: data that is a result of the processing of observation data or other derived data.

Designation/designations: one or more informational representations regarding one of more sensor observations or one or more sensor observation subjects.

Determination of identity: (a) determination of previously unknown identity, or (b) verifying or denying claimed identity.

Full spectrum: the complete set of possible choices for a given variable or option, which includes the subset of available choices for any given variable or option. Thus, for example, the full spectrum of cyber resources is the complete set of possible cyber resources, which includes all available cyber resources.

Identity determinations: at least one cyberspace identity verification test determination regarding any one specific tested person. A cyberspace identity verification test may be configured to make at least one cyberspace identity verification test determination selected from the group consisting of (a) determining that one specific tested person is the exact same person as one specific known person, (b) determining any percentage of probability that exists of one specific tested person being the exact same person as one specific known person, and (c) determining that one specific tested person absolutely is not the same person as one specific known person.

Known person: one specific person who is the one specific known subject of at least one first series observation record.

Observation data: data from at least one sensor observation that is utilized by a cyberspace identity verification test.

Or: unless otherwise specified herein, the term "or" shall be construed as the logically inclusive "or". Hence, the statement "A or B" shall be true if only A is true, if only B is true, or if both A and B are true. The notation "A and/or B" explicitly refers to the logically inclusive "or".

Period of time: any increment of time that is longer than a point in time.

Processing: one or more actions or processes that are made to sensor data or derived data wherein the processing of sensor data or derived data results in the creation of derived data.

Real time: occurring in a period of time that is so short that it is perceived by a person to have occurred immediately.

Recognized: any aspect of an observation or a subject of an observation that has been identified for further utilization.

Selected from: "from" or "selected from". One skilled in the art will appreciate that the expression "x is selected from the group G", where x is a group member variable and G is the group, is legal terminology (Markush language) which is merely intended to specify possible values for x, and which does not by itself suggest or imply an actual selection step in any methodology or system this terminology is being used to describe.

Series: a group of at least one.

Tested person: one specific person who is one specific subject of at least one second series observation step; one specific person who has not currently been determined, utilizing predetermined criteria, to be the same person as one specific known person.

Unique: occurring at a selected ratio other than the ratio of absolutely unique.

OVERVIEW

In accordance with the teachings herein, unique cyberspace identity datasets regarding any one specific person and a scalable configurable universal full spectrum cyberspace identity verification test are disclosed. The unique cyberspace identity datasets regarding any one specific person and the cyberspace identity verification test may accurately and reliably be utilized to make one or more cyberspace identity verification test determinations from a full spectrum of cyberspace identity verification test determinations. The systems and methodologies disclosed herein for providing unique cyberspace identity verification test datasets regarding any one specific person and accurate cyberspace identity verification test determinations regarding any one specific tested person provide the foundation upon which a secure, safe, and private technologically interconnected version of cyberspace may be built.

Additionally, through utilization of unique cyberspace identity verification test datasets regarding any one specific person and the accurate and reliable cyberspace identity verification test determinations regarding any one specific tested person that are disclosed herein, cyberspace may soon change from an environment of unparalleled chaos, to a unified and orderly technologically interconnected environment that provides all users with reasonable levels of cybersecurity, cyber safety, and cyber privacy.

The following list includes a portion of the resources and features from the full spectrum of resources and features that may be provided by unique cyberspace identity verification test datasets regarding any one specific person and the disclosed scalable configurable universal full spectrum cyberspace identity verification test:

a. cyberspace identity verification test determinations regarding some or all people from a full spectrum of tested people who are subjects of cyberspace identity verification tests;

b. cyberspace identity verification tests that utilize some or all aspects from a full spectrum of aspects of subjects of cyberspace identity verification tests;

c. cyberspace identity verification tests that fill some or all needs from a full spectrum of needs for cyberspace identity verification test determinations;

d. cyberspace identity verification test determinations that may be provided at one or more attainable levels of accuracy including 100% accuracy;

e. cyberspace identity verification tests that may utilize some or all resources from a full spectrum of available useful resources;

f. cyberspace identity verification tests that may utilize some or all information from a full spectrum of available useful information;

g. cyberspace identity verification tests that may utilize some or all sensor observations from a full spectrum of available useful sensor observations;

h. cyberspace identity verification tests that may utilize some or all observable characteristics of one specific subject of a sensor observation from a full spectrum of observable characteristics of subjects of sensor observations;

i. cyberspace identity verification tests that may utilize some or all criteria from a full spectrum of useful criteria;

j. cyberspace identity verification tests that utilize standard designations for accurately and reliably representing any aspect of the operations of the cyberspace identity verification test;

k. cyberspace identity verification test determinations that may be (i) made one single time, or (ii) made intermittently, or (iii) made constantly;

l. utilization of cyberspace identity verification test determinations for the purpose of accurately granting or denying access to any from the list of (i) the cyberspace identity verification test itself, (ii) cyber resources that are being utilized by the cyberspace identity verification test, and (iii) cyber resources that are utilizing the cyberspace identity verification test;

m. security and privacy, which may include absolute security and privacy, for some or all cyber resources or activities;

n. sensor observations of a person, where the person as a subject of an observation may be at any one point in a range of, from being observable but not being consciously engaged in a sensor observation, to being consciously engaged and participating in a sensor observation;

o. scalability in regard to included necessary resources, wherein a cyberspace identity verification test may be specifically configured to include only the resources that are necessary to provide for cyberspace identity verification test needs for necessary resources at any one point in a range from providing for the smallest of all cyberspace identity verification test needs in regard to included necessary resources, to providing for the largest of all cyberspace identity verification test needs in regard to included necessary resources;

p. ease of use in some or all phases of operations;

q. persistence in attempting to achieve selected attainable cyberspace identity verification test determination goals;

r. utilization of one or more observed visual, physical, behavioral or biological characteristics of one specific person for making cyberspace identity verification test determinations regarding one specific tested person;

s. alteration of operations of the cyberspace identity verification test itself or any resources being utilized by the cyberspace identity verification test for any purpose, including the purpose of aiding in achieving at least one cyberspace identity verification test determination goal;

t. utilization of useful information that was derived from any source;

u. utilization of a unique combination of simultaneously occurring observed characteristics of any one specific person for the purpose of providing cyberspace identity verification test determinations regarding one specific tested person; and v. utilization of a combination of observed characteristics of any one specific person that occur over at least one period of time for the purpose of making at least one cyberspace identity verification test determination regarding one specific tested person.

Proper utilization of cyberspace identity verification test determinations regarding one specific tested person as disclosed herein, cyberspace identity verification test determinations that may be highly accurate, including being 100% accurate, may, for the first time ever, enable the world to enjoy the benefits of a secure, safe, and private technologically interconnected cyberspace environment and cyberspace ecosystem. Among the many benefits that may be derived from the utilization of the cyberspace identity verification test disclosed herein is its ability to determine and report on any indicated measure of probability that exists of one specific tested person being the same person as one specific known person. At one end of the full spectrum of these cyberspace identity verification test determinations is a determination that one specific tested person absolutely is the same person as one specific known person, and at the other end of the spectrum is a cyberspace identity verification test determination that the one specific tested person absolutely is not the same person as the one specific known person.

Through the utilization of cyber resources and predetermined criteria, a preferred embodiment of the cyberspace identity verification test disclosed herein provides cyberspace identity verification test determinations by comparing one specific tested subject of at least one sensor observation with one specific known subject of at least one sensor observation. The cyberspace identity verification test utilizes predetermined criteria for every aspect of the operations of the cyberspace identity verification test where criteria are used. The cyberspace identity verification test may also provide or utilize standard designations to represent observations, characteristics and other aspects of the operations of the cyberspace identity verification test.

The scalable configurable universal full spectrum cyberspace identity verification test, (a) may be configured as a single self-contained cyberspace identity verification test, (b) may be configured to include utilization of more than one interconnected resource, (c) may be utilized as an integral or remote resource of a device or system, (d) may utilize all or any part of the resources of at least one device or system, (e) may be utilized with a virtual device or a physical device or any combination thereof, (f) may be utilized by a stationary device or a mobile device or a combination thereof, (g) may be utilized by one or more devices that are located in one or more locations, and (h) may utilize resources that may be interconnected in any useable way.

FIG. 1 depicts a first particular, non-limiting embodiment of the operations of the scalable configurable universal full spectrum cyberspace identity verification test in accordance with the teachings herein for making cyberspace identity verification test determinations from a full spectrum of cyberspace identity verification test determinations. The operations of the cyberspace identity verification test depicted herein, which uses suitable cyber resources and predetermined criteria, may commence by utilizing all or any part of a first series observation step 10 performed on one specific known person who is one specific subject of at least one sensor observation. The first series observations step 10 includes capturing at least one first series observation 10*a* of the one specific known person, recognizing characteristics 10*b* from the captured observation, and then assigning designations 10*c* representing the observation and characteristics from the observation of the one specific known person. These designations may be included, as data, as a part of at least one first series observation record 30, which represents the cyberspace identity of the one specific known person.

The cyberspace identity verification test may further include utilization of all or any part of a second series observation step 20 performed on one specific tested person who is one specific subject of at least one second series observation. The second series observation step 20 includes capturing at least one second series observation 20*a* of the one specific tested person, recognizing characteristics 20b from the captured observation, and then assigning designations 20c representing the observation and aspects from the one specific tested person. These designations may be included, as data, as a part of at least one second series observation record 40, which represents the one specific tested person.

The cyberspace identity verification test may interact with utilized cyber resources to control the operations of those resources for any purpose, including (a) the purpose of capturing any possible observations, and (b) the purpose of providing any useful variation of the operation of the cyberspace identity verification test itself or any other cyberspace identity verification test utilized cyber resources.

Any step of the operations of the cyberspace identity verification test, or any portion thereof, may be performed in any useable order or sequence.

Operating in any usable order or sequence, and utilizing all or any part of at least one of the following steps, the cyberspace identity verification test may:

a. utilize useful observations or useful information from any source;

b. determine or utilize the level of cyberspace identity verification test determination accuracy that has been achieved;

c. determine or utilize a measure of adequacy of available resources;

d. utilize cyber resources to capture first series observations or second series observations;

e. recognize useful characteristics from observations;

f. utilize recognized characteristics from observations;

g. utilize at least one unique characteristic for providing cyberspace identity verification test determinations;

h. assign designations to recognized characteristics;

i. process observation data from first series observation records or second series observation records, during a processing step 50, the processing of observation data results in the creation of derived data wherein the observation data or the derived data may be utilized in: at least one processing step, at least one matching step, at least one comparing step, or at least one determining step;

j. determine which, and the order in which, observation data or derived data will be utilized for processing, matching, comparing or determining;

k. match observations and recognized characteristics from second series observation records, during a matching step 60, with corresponding comparable observations and recognized characteristics from first series observation records;

l. determine and provide conclusions as to the indicated measure of comparison between characteristics from the second series observation records and characteristics from the first series observation records during a comparing step 70;

m. select which conclusions from comparing will be utilized for making cyberspace identity verification test determinations;

n. utilize (i) observation data, (ii) derived data, (iii) conclusions from comparing, or (iv) useful information, for making cyberspace identity verification test determinations;

o. provide cyberspace identity verification test determinations regarding the identity of one specific tested person that determine any indicated measure of probability that exists of the one specific tested person and the one specific known person being the same person during a determining step 80; and p. report on any aspect of the operations of the cyberspace identity verification test during a reporting step 90.

Additionally, based upon predetermined criteria, the cyberspace identity verification test may be persistent in attempting to attain a selected cyberspace identity verification test determination goal. As an example, should a cyberspace identity verification test determination, based upon conclusions from comparing a first characteristic of one specific tested person to one specific comparable characteristic of one specific known person, not result in the cyberspace identity verification test achieving a selected cyberspace identity verification test determination goal, then the cyberspace identity verification test may continue the comparing and determining until the selected cyberspace identity verification test determination goal is achieved or there are no further first and second series observation records to compare.

Should a cyberspace identity verification test determination that is based upon conclusions from comparing all available useful characteristics of the one specific tested person not result in the making of the selected cyberspace identity verification test determination goal, then the cyberspace identity verification test may utilize at least one additional observation of the one specific tested person to add to the second series observation records of the one specific tested person.

The cyberspace identity verification test may select a portion of a first series observation record of one specific known person to be repeated by the one specific tested person for inclusion in the one specific tested person's second series observation records.

In order for the cyberspace identity verification test to capture observations that are most likely to aid in achieving selected cyberspace identity verification test determination goals, the cyberspace identity verification test may alter any operational aspect that may be altered of any cyber resource that the cyberspace identity verification test is utilizing for capturing observations.

DESCRIPTION

The scalable configurable universal full spectrum cyberspace identity verification test disclosed herein may be utilized to merge the present with the future, which may be further appreciated after reading the following vision of a technologically interconnected future.

We live in a technologically interconnected world where vast cyber resources presently exist. Within this technologically interconnected world, we utilize cyber resources from a full spectrum of available cyber resources. This full spectrum of available cyber resources is ever widening, and over time, our technologically interconnected world appears to be destined to provide every possible cyber resource that humanity could ever want or need. When that time comes, the entire body of cyber resources will include—and will rely heavily upon—a scalable configurable universal full spectrum cyberspace identity verification test (such as the scalable configurable universal full spectrum cyberspace identity verification test of the present disclosure) that can be configured to constantly provide real time 100% accurate cyberspace identity verification test determinations regarding any one specific tested person. In addition, data sets that are utilized by the cyberspace identity verification test may also be used in real time for making additional determinations regarding the one specific person who was tested.

To more fully understand the implications of the utilization of the cyberspace identity verification test of the present disclosure, it is helpful to see its relationship to (a) U.S. Ser. No. 15/483,970 (Aronson), entitled "Scalable Configurable Universal Operating System", filed Apr. 10, 2017, now pending; (b) U.S. Pat. No. 8,832,794 (Aronson), entitled "Point-of-Cyber-Access Cyber System", issued May 23, 2017; (c) U.S. Pat. No. 9,479,507 (Aronson), entitled "Single-Point-of-Access Cyber System", issued on Oct. 25, 2016; and (d) U.S. Pat. No. 8,832,794 (Aronson), entitled "Single-Point-of-Access Cyber System", issued on Sep. 9, 2014.

The core operations of a preferred embodiment of the disclosed cyberspace identity verification test may best be understood through a particular, detailed and non-limiting example of the utilization of this cyberspace identity verification test for the purpose of accurately making cyberspace identity verification test determinations regarding one specific tested person that determine whether or not the one specific tested person and one specific known person absolutely are the same person. One of many predetermined criteria utilized for performing this cycle of the utilization of the cyberspace identity verification test is that the full resources that are available to the cyberspace identity verification test should be utilized in any way possible to persistently work towards accomplishing the selected cyberspace identity verification test determination goal.

In one scenario, a "known person" owns a portable computer. The cyberspace identity verification test is configured to be an integral resource of the known person's portable computer. The cyberspace identity verification test is utilized, in part, for making one-time cyberspace identity verification test determinations that may then be utilized to exclusively grant only the known person initial access for further use of his or her portable computer's resources. The portable computer may utilize, for any purpose, the known person's personally configured and built cyberspace identity verification test. In addition, the portable computer includes a microphone and a camera with adjustable operations that the cyberspace identity verification test may utilize and also control.

The cyberspace identity verification test utilizes data regarding observations of the known person that come from what may be a vast collection of data that makes up the known person's first series observation records. The first series observation records of the known person are exclusively made up of observations that include the known person as a subject of the observation. The known person's first series observation records are comprised of data regarding designations from observations. Data from one specific known person's first series observation records make up the cyberspace identity of the one specific known person.

A cycle of the utilization of the cyberspace identity verification test is initiated by one specific tested person requesting use of the known person's portable computer.

Every aspect of the operation of the cyberspace identity verification test utilizes predetermined criteria. Criteria from a full spectrum of criteria may be predetermined by the known person, or criteria may be predetermined as an integral part of the operations of the cyber resources that were selected for use, or criteria may be predetermined as a part of the operations of the cyberspace identity verification test, or criteria may be predetermined utilizing any other means for selecting criteria, or any combination thereof. Selection of anything may also constitute selecting criteria.

Criteria are selected choices of who, when, where, what, why, or how as each relates to any aspect of the operations of the cyberspace identity verification test. Providing a choice of any possible criteria, and any criteria being possible, may well be the most important feature that many cyber resources have to offer. The cyberspace identity verification test disclosed herein may take full and best advantage of this particular cyber feature by providing any user with a choice of selection of available criteria regarding any aspects of his or her utilization of the cyberspace identity verification test.

In the instance of this cycle of the utilization of the cyberspace identity verification test, the cyberspace identity verification test, utilizing predetermined criteria, utilizes the computer's camera to capture images of the tested person. The cyberspace identity verification test, again using predetermined criteria, utilizes the zoom feature of the camera to closely frame an image of only the face of the tested person in order to provide an observation that would most likely aid in achieving a selected cyberspace identity verification test determination goal.

As a part of either series of observations, utilizing cyber resources and predetermined criteria, the cyberspace identity verification test recognizes useful characteristics of any kind from the observations.

The cyberspace identity verification test may provide and utilize a standard set of designations for accurately and reliably representing any aspect of the cyberspace identity verification test or its operations.

Utilization of one, and only one, standard set of designations is an important part of accurately, reliably and consistently providing cyberspace identity verification test determinations while utilizing any available observation or cyber resources from any place on the planet. This approach also preferably implements a strategy of providing, on a worldwide basis, extremely consistent and accurate assignments of standard designations to every recognized aspect of each and every cyberspace identity verification test observation and observed characteristic.

Designations that accurately and reliably represent the observations and observed characteristics, including designations representing the captured image of the tested person's face are assigned and then included, as data, in second series observation records of the one specific tested person for utilization in this cycle of the operation of the cyberspace identity verification test. In addition, standard designations may be accurately and consistently assigned, according to cyberspace identity verification test standards, so that designations representing observations and recognized characteristics from either series of observations may be universally utilized across the entire technologically interconnected cyberspace environment where the cyberspace identity verification test is utilized.

The cyberspace identity verification test utilizes predetermined criteria for matching data representing characteristics from the tested person's second series observation records with data representing characteristics from at least one comparable first series observation record of one specific known person.

In the instance of this cycle of the utilization of the cyberspace identity verification test, predetermined criteria preferably call for selecting and then utilizing at least one comparable observation record from the first series observation records of the one specific known person. Further, the at least one selected observation record may be the most likely of all available observation records to aid in accurately achieving the selected cyberspace identity verification test determination goal.

Through the incredible speed and power of the operations of cyber resources, any large number of criteria may collectively or selectively be utilized for any aspect of the operations of the cyberspace identity verification test.

In the instance of this cycle of the utilization of the cyberspace identity verification test, predetermined criteria may utilize parameters such as time, date, temperature, light sources, light levels, the portion of the tested person that was observed, and the clarity of observation for matching the second series observation records of the one specific tested person with at least one comparable first series observation record of the one specific known person who is the proprietary user of the computer.

The cyberspace identity verification test provides final determinations for many aspects of each observation at the time when designations are assigned to recognized characteristics. For example, a final determination may be provided that one specific person who was one specific subject of a sensor observation had red hair, or hazel eyes, or a particular geometry and ratio of change with the movement of the one specific person's hand, face or head, or any other visual, physical, behavioral or biological characteristic.

Further, when utilizing an observation that has more than one specific person as a subject of the observation, the cyberspace identity verification test may exclude, from further determinations, any person who is one specific subject of an observation who has been determined to not fit certain criteria. For example, in keeping with the previous example, the cyberspace identity verification test may exclude from further determinations any person who has been determined to have hair that is not red and eyes that are not hazel. Also, based upon predetermined criteria, one specific tested person may be determined to absolutely not be the same person as the one specific known person if it was determined that the one specific tested person did not have red hair and hazel eyes.

This instance of the utilization of the cyberspace identity verification test includes at least one processing step, wherein at least one part of the observation data from at least one second series observation of the one specific tested person is processed in at least one way, and the processing results in the creation of derived data. The derived data is then used by the cyberspace identity verification test during: (a) at least one additional processing step, (b) at least one matching step, (c) at least one comparing step, and (d) at least one determining step. In the instance of this cycle of utilization of the cyberspace identity verification test, observation data and derived data are processed and the resulting derived data is data regarding changes in one or more sensor observable characteristics of the one specific tested person that occurred over one or more periods of time. The changes that occurred were changes that represent unique visual, physical, biological, and behavioral characteristics of the one specific tested person.

Utilizing cyber resources and predetermined criteria, matched observation records of the one specific tested person and the one specific known person are compared by the cyberspace identity verification test. Any predetermined criteria may be utilized by the cyberspace identity verification test for any aspect of comparing observations.

Utilizing cyber resources and predetermined criteria, conclusions from comparing data from observation records, observation data, derived data or useful information may be utilized by the cyberspace identity verification test for making cyberspace identity verification test determinations. Any predetermined criteria may be utilized by the cyberspace identity verification test for any aspect of making cyberspace identity verification test determinations.

As a specific example, suppose that in the instance of this cycle of utilization of the cyberspace identity verification test, one specific tested person is wearing large dark glasses that prevent the cyberspace identity verification test from utilizing any comparison from the entire area of his or her eyes. Suppose further that the one specific tested person is wearing a hat that covers the area where the one specific known person has a small scar crossing a pea-sized birthmark. As a result, this very unique biological characteristics of the one specific known person cannot be utilized for making cyberspace identity verification test determinations regarding the one specific tested person.

In such a case, the conclusion from comparing a first set of matched characteristics may not provide a cyberspace identity verification test determination that met the goal of this cycle of the utilization of the cyberspace identity verification test. Hence, following predetermined criteria, the cyberspace identity verification test may be configured to continue to utilize conclusions from the comparison of characteristics until the goal of this cycle of the utilization of the cyberspace identity verification test is attained, or until there are no further conclusions from the comparing step to utilize.

In the present example, the goal of this cycle of the utilization of the cyberspace identity verification test has not been attained. Hence, the cyberspace identity verification test selects utilization of a further observation of the tested person's left hand. In this example, the cyberspace identity verification test requests that the tested person fully open his or her left hand in the presence of the computer's camera, with the fingernails facing the camera, and that the properly positioned hand be closed and opened again fully.

The one specific tested person, still wanting to gain access to the resources of the known person's computer, complies with the request from the cyberspace identity verification test. The request was presented to the one specific tested person on the computer's image display screen. The cyberspace identity verification test operates the zoom on the computer's camera to provide the optimum captured observation for this cycle of the utilization of the cyberspace identity verification test.

In this instance, the cyberspace identity verification test utilizes comparisons of data that was derived from observation designations regarding the geometry of movement of, and the visual presence of the moving hand and fingers, for providing this cyberspace identity verification test determination.

The selected second series observation record provides an overabundance of visual, physical, behavioral and biological characteristics that may be utilized for making the previously selected cyberspace identity verification test determination, far more than are needed for determining, with essentially 100% accuracy, that the one specific tested person and the one specific known person absolutely are the same person. In the present example, just a portion of the characteristics that were recognized from the opening and closing of a single finger may have been used to achieve the selected cyberspace identity verification test determination goal.

Once the selected cyberspace identity verification test determination goal has been attained, the cyberspace identity verification test may report the determination. The cyberspace identity verification test may utilize cyber resources and predetermined criteria for any aspect of reporting.

In the instance of this cycle of the utilization of the cyberspace identity verification test, the verification of identity is reported to a history that the cyberspace identity verification test maintains, and also to programming running on the portable computer of the known person whereby, having received the report from the cyberspace identity verification test that the one specific tested person absolutely is the one specific known person who is the proprietary user of the computer, the computer then grants the one specific known person exclusive access to use of the resources of his or her own computer. History, or any other aspect of the operations of the cyberspace identity verification test, may be stored in volatile or non-volatile memory, e.g., in one or more storage modules that are utilized by one or more computers.

Figure 2:
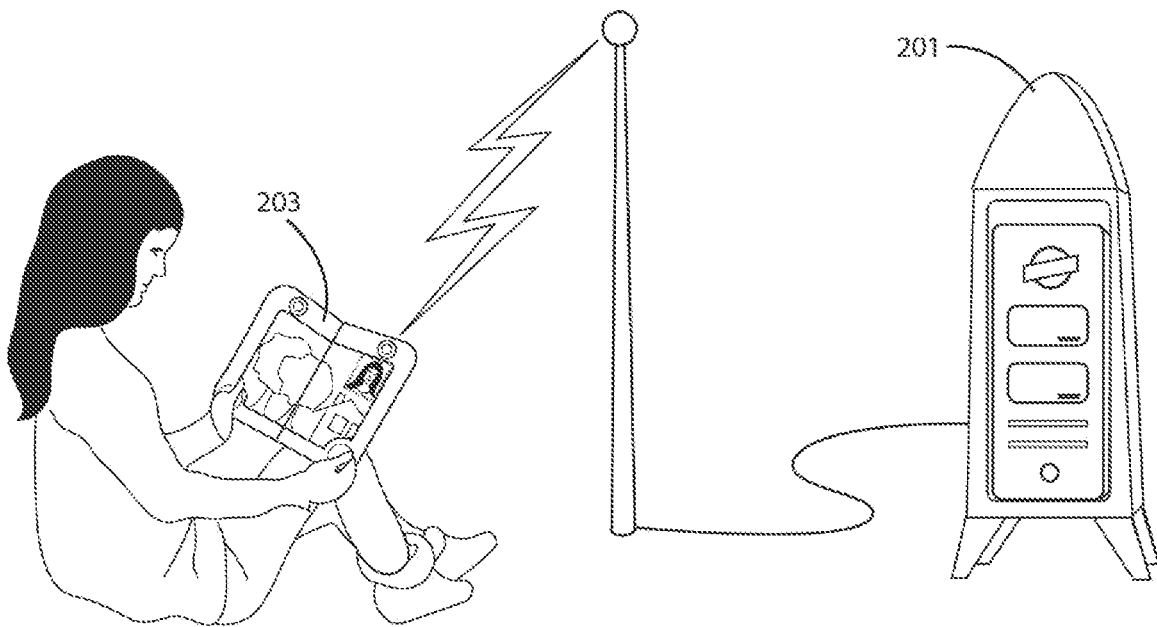
FIG. 2 is an overview diagram of a person utilizing a cyber portal for gaining access to her remotely located point of cyber access computer. The cyberspace identity verification test is an integral resource of the point of cyber access computer, and the cyberspace identity verification test is utilized for providing identity verification test determinations regarding one specific tested person as a prerequisite and ongoing requirement for that one specific tested person to initially gain, and continue to have access to the point of cyber access computer. The point of cyber access computer and the cyber portal are components of the "Single-Point-of-Access Cyber System" described in U.S. Pat. No. 9,479,507 (Aronson) and the "Point-of-Cyber-Access Cyber System" described in U.S. Pat. No. 9,660,996 (Aronson), both of which are incorporated herein by reference in their entirety. This diagram illustrates a particular, non-limiting embodiment of the cyberspace identity verification test disclosed herein.

FIG. 2 depicts a particular, non-limiting embodiment of one specific person utilizing a cyber portal for gaining access to her remotely located point of cyber access computer. The cyberspace identity verification test is utilized as an integral resource of this point of cyber access computer, and the cyberspace identity verification test is utilized for constantly making cyberspace identity verification test determinations regarding one specific tested person as a prerequisite for granting initial access to the one specific tested person and granting continued access after the initial granting of access. The point of cyber access computer and the cyber portal are components of the "Single-Point-of-Access Cyber System" and the "Point-of-Cyber-Access Cyber System".

Figure 3:
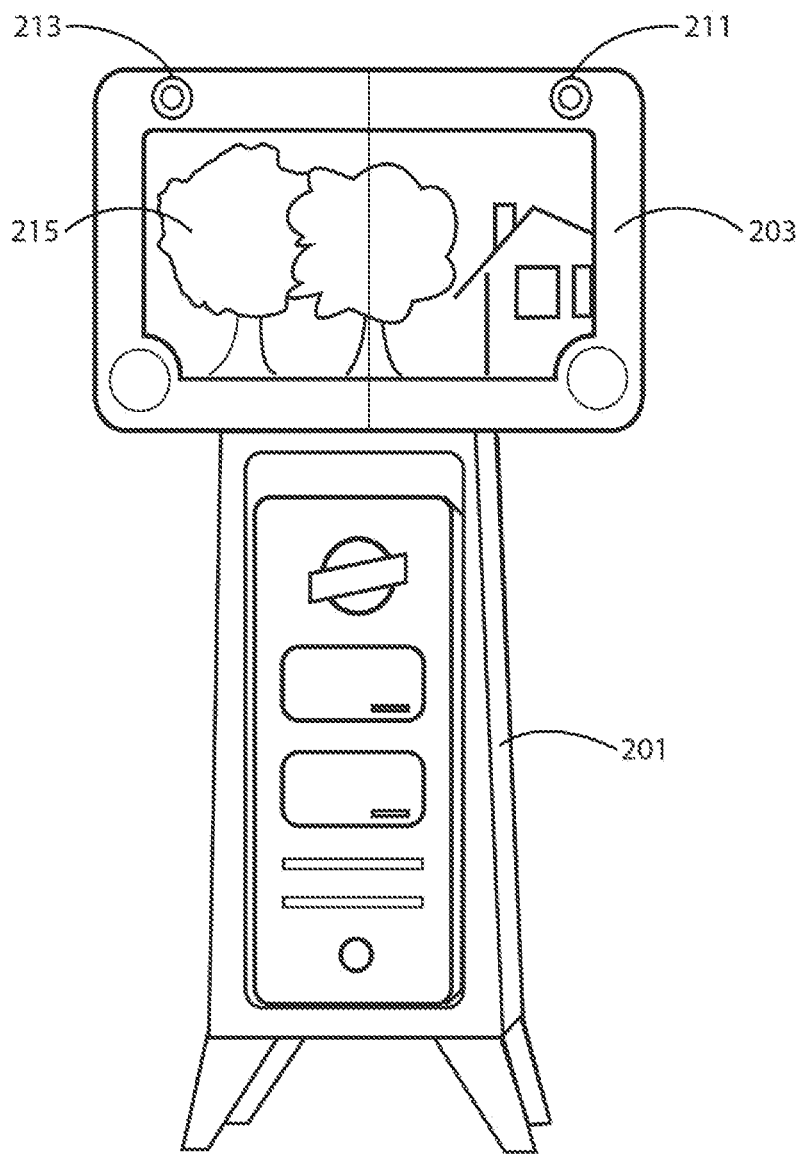
FIG. 3 is an overview diagram of a point of cyber access computer that comprises an integral cyber portal and also a cyberspace identity verification test that is personally configured to be used for testing the identity of the one specific person who is the proprietary user of this specific point of cyber access computer. The cyberspace identity verification test is configured to be utilized to continuously determine if the one specific tested person is, with 100% accuracy, the one specific known person who is the proprietary user of this point of cyber access computer. This diagram illustrates one particular, non-limiting embodiment of the cyberspace identity verification test disclosed herein.

FIG. 3 depicts a particular, non-limiting embodiment of a point of cyber access computer with an integral cyber portal.

In order to best demonstrate a few selected further utilizations of the systems and methodologies disclosed herein, it is helpful to consider the future, which may be illustrated with reference to the Single-Point-of-Access Cyber System. This is advantageous in that the Single-Point-of-Access Cyber System is a technologically interconnected cyberspace environment and cyberspace ecosystem that may provide for the fullest and best utilization of a scalable configurable universal full spectrum cyberspace identity verification test such as the cyberspace identity verification test of this disclosure.

To begin with, the Single-Point-of-Access Cyber System architecture provides for each person to proprietarily utilize a remotely accessible point of cyber access computer 201. Each person may utilize any mobile or stationary remote terminal-type of device that is called a cyber portal 203 to gain secure and private access to his or her own remotely located point of cyber access computer 201.

Each person's own remotely located point of cyber access computer may utilize the cyberspace identity verification test disclosed herein for making cyberspace identity verification test determinations with a high degree of accuracy, up to and including 100% accuracy. In this example, when 100% accuracy has been achieved, the one specific tested person will be determined to absolutely be the same person as the one specific known person who is the proprietary user of the remotely located point of cyber access computer, which must occur before the one specific tested person is granted access to the personal and private resources of his or her own personal remotely located point of cyber access computer. In addition, the one specific known person who is the proprietary user of the point of cyber access computer must also have his or her identity constantly verified in order to maintain continued access to the resources of his or her point of cyber access computer.

Enabled by the disclosed cyberspace identity verification test, the Single-Point-of-Access Cyber System may be utilized to provide a technologically interconnected world with a cyberspace environment and cyberspace ecosystem that provides for the highest attainable levels of cyber security, cyber safety, and cyber privacy.

A cycle of utilization of the cyberspace identity verification test is initiated by a yet-to-be-identified person who utilizes any cyber portal 203 to call up his or her own personal, remotely located point of cyber access computer 201, and then request access to the personal and private resources of his or her own point of cyber access computer.

Each person's point of cyber access computer may be configured to where only one specific person, the point of cyber access computer's proprietary user, may gain access to its personal and private resources, and only after that one specific person has, with 100% accuracy, been determined to be the proprietary user of the point of cyber access computer. In this instance, the cyberspace identity verification test is utilized by the point of cyber access computer. The cyberspace identity verification test component of the point of cyber access computer requests, through use of the cyber portal's image display screen 215, that the one specific tested person requesting access repeat a phrase the cyberspace identity verification test has randomly selected from the first series observation records of the proprietary user of the point of cyber access computer.

The cyberspace identity verification test may utilize any criteria for selecting the phrase to be repeated. For example, in the instance of this cycle of the utilization of the cyberspace identity verification test, the phrase to be repeated may be selected based upon camera observations from the utilized cyber portal in regard to light levels, light source, pose, camera angle, movement of the one specific tested person, movement of the cyber portal, and a number of other cyberspace identity verification test selected criteria.

The one specific tested person repeats the cyberspace identity verification test selected phrase for the microphone 213 and camera 211 of the cyber portal 203. The cyberspace identity verification test, utilizing predetermined criteria and available cyber resources, controls the operations of the microphone 213 and the pan, tilt, and zoom modes of the camera 211 of the cyber portal in order to capture the optimum second series observation of the one specific tested person.

The cyberspace identity verification test recognizes characteristics from this observation and accurately assigns standard designations to recognized characteristics. The designations representing the observation and recognized characteristics are included, as data, in the one specific tested person's second series observation records.

Data representing the designations from the repeating of the selected phrase are then compared, utilizing the predetermined criteria of first matching the peak and valley graph representations of the sound of the voice from the repeating with the peak and valley graph representations of the voice from the one specific known person, who is the proprietary user of the point of cyber access computer, originally speaking the phrase that was repeated. Then, if a match exists, the cyberspace identity verification test further compares the position of the mouth at various points in time such as, for example, at the points in time when there are high peaks in the peak and valley voice graph.

In this instance, the cyberspace identity verification test determines that the one specific tested person requesting access absolutely is the one specific known person who is the proprietary user of the point of cyber access computer and the proprietary user is thereby granted exclusive initial access to the personal and private resources of his or her own personal remotely located point of cyber access computer 201.

It is best to utilize, environment-wide, a set of cyberspace identity verification test criteria that provide a person with secure, safe, and private access to his or her own remote or local computer or other cyberspace resources. To achieve this secure, safe and private cyberspace environment and cyberspace ecosystem, it is desirable to utilize criteria that require an 100% accurate cyberspace identity verification test determination be made and passed by one specific tested person before granting that one specific tested person access to his or her own computer or available cyber resources. It is further recommended that criteria be utilized that require constant continued 100% accurate cyberspace identity verification test determinations be made of the same one specific tested person while he or she continues to utilize, in any way, his or her own computer or available cyberspace resources.

In light of the foregoing, the Single-Point-of-Access Cyber System not only requires that a person be accurately determined to be the proprietary user of his or her point of cyber access computer before the person may gain access to its personal and private resources, but the Single-Point-of-Access Cyber System also preferably requires the person utilizing his or her point of cyber access computer be constantly determined to be its proprietary user while he or she is using, in any way, the resources of his or her own personal point of cyber access computer.

One example of how the cyberspace identity verification test may constantly make cyberspace identity verification test determinations utilizes sequential video images of the face of the one specific person who is the user of the cyber portal. Predetermined criteria call for real time comparison of first series observation data representing aspects or characteristics from sequential images of the one specific person's face who is the user of the cyber portal with matching data representing comparable aspects or characteristics from first series observations of the one specific person who is the proprietary user of the point of cyber access computer. Additionally, for this cycle of utilization of the cyberspace identity verification test, predetermined criteria preferably call for 100% accurate cyberspace identity verification test determination to constantly be made.

In the event that it is not possible to utilize the prior strategies for providing constant determinations of identity of the user of a cyber portal, then the cyberspace identity verification test may utilize any possible aspects of sensor observations of the user of the cyber portal to persistently attain 100% accurate cyberspace identity verification test determinations that the one specific tested person who is using the cyber portal is the one specific known person who is the proprietary user of the point of cyber access computer that is performing the testing.

A point of cyber access computer from the Single-Point-of-Access Cyber System or the Point-of-Cyber-Access Cyber System is preferably a remotely accessible computer that securely and privately provides almost every cyber resource the proprietary user of the point of cyber access computer could ever want or need.

The scalable configurable universal full spectrum cyberspace identity test-enabled, secure, safe, and private technologically interconnected cyberspace environment and cyberspace ecosystem of the Single-Point-of-Access Cyber System or the Point-of-Cyber-Access Cyber System may be utilized to provide the planet with vast new cyber resources. Among those resources will be resources that utilize data from second series observation records for regularly monitoring, in real time, at least one selected aspect of a person's health.

A voice operated point of cyber access computer may be fully utilized through use of a cyber portal that is similar in size and worn similarly to a wristwatch. Although a cyber portal with an image display screen of such a small size may require intermittent use of a larger image display screen, a wristwatch-configured cyber portal may nonetheless provide the greatest all-around utility of any cyber portal configuration, in part because a wristwatch-configured cyber portal that includes one or more health sensors may be utilized in conjunction with the disclosed cyberspace identity verification test for constantly making real time cyberspace identity verification test determinations and also for securely and privately monitoring and reporting to one's own point of cyber access computer any possible sensor-derived health observations (both internally and externally).

A person's own personal point of cyber access computer may then utilize those cyberspace identity verification test health-related sensor observations for providing the person (perhaps through use of his or her wristwatch-configured cyber portal) reports of any health information that the person may want or need to be made aware of.

Through utilization of the security, safety and privacy that is enabled by use of cyberspace identity verification test determinations regarding any one specific person that are provided by the disclosed cyberspace identity verification test and the resources of the Single-Point-of-Access Cyber System or the Point-of-Cyber-Access Cyber System, it may be possible to securely and privately provide all, or any part, of a person's own personal and private health information to health care providers of choice so that those health care providers may have the ability to better provide the one specific person with the best of all possible health care outcomes.

Additionally, it may be possible for a person to anonymously provide all, or any part, of his or her health information to selected others for health-related research.

Looking to the present again, and more particularly cybersecurity's present need for an easy to use, versatile cyberspace identity verification test that can be configured to constantly provide 100% accurate cyberspace identity verification test determinations regarding any one specific person, it is clear that prior art's cyber identity measures fail to meet present needs for 100% accurate cyberspace identity verification determinations. This is so because prior art cyber determination of identity measures do not go so far as to identify each one specific person by means of utilizing unique visual, physical, behavioral or biological characteristics of the person that cannot be replicated by any others. The cyberspace identity verification test of the present disclosure may be configured to provide determinations of identity of any one specific tested person by utilizing unique visual, physical, behavioral or biological characteristics of the person. These characteristics are preferably of a type that cannot be replicated by any other person or device.

The scalable configurable universal full spectrum cyberspace identity verification test, as utilized for providing essentially 100% accurate cyberspace identity verification test determinations regarding any one specific person, preferably utilizes as many unique visual, physical, biological or behavioral characteristics of a person as are necessary to achieve an attainable selected cyberspace identity verification test determination goal. Many examples of characteristics of a person have previously been addressed. However, when internal and external sensor observations (which may include visual, physiological or biological sensor observations) of a person are utilized, there are a very large number of possible unique combinations of characteristics that may be utilized for providing cyberspace identity verification test determinations regarding any one specific person. With every unique behavioral or biological characteristic of a person that has been sensor observed also exists a means for accurately providing cyberspace identity verification test determinations by comparing second series observation data of one specific tested person to data from the first series observation records of one specific known person.

Within the full spectrum of cyberspace identity verification test determinations regarding one specific person are a multitude of cyberspace identity verification test determinations that fall short of providing a determination that one specific tested person and one specific known person absolutely are the same person. For example, there are determinations of hair color, moles, wrinkles in skin, freckles, geometry of motion at joints, scars, height, eye color, and so forth.

There are also cyberspace identity verification test determinations of any measure of probability that exists of one specific tested person and one specific known person being the same person. This type of determination is useful in many ways: for example, it may be utilized to provide an indicated measure of probability that has been accomplished at a specific point in an operational cycle of use of the cyberspace identity verification test. Additionally, should there be more than one tested person as a subject of a second series observation, all those who are not the same person as the known person may be eliminated by utilizing an ever increasing selected minimum indicated measure of probability to quickly eliminate all of the people who are observation subjects who are not the one specific known person.

The cyberspace identity verification test disclosed herein may be utilized for determining the exact identity of one specific tested person even when there is no knowledge of who the tested person might be other than the data representing second series observations designations regarding the one specific tested person. For example, the cyberspace identity verification test may determine who one specific tested person is by utilizing selected criteria that call for the most unique combination of recognized characteristics of the tested person be utilized for searching available databases of first series observation records of known persons. This search may continue until either one specific known person is found that absolutely is the same person as the one specific tested person, or there are no further first series observation records of comparable known people from which to search and compare.

The cyberspace identity verification test disclosed herein may also utilize useful information from any source for providing cyberspace identity verification test determinations. Perhaps the most useful of all information that may be utilized by the cyberspace identity verification test, when making determinations regarding the identity of any one specific person would be information as to exactly who the one specific tested person is. If the information that the cyberspace identity verification test utilizes is accurate, then comparison of only one specific person's first series observation records to the second series observation records of the one specific tested person will provide verification of the reported identity of the tested person.

Prior art cybersecurity measures fail to reliably control access to cyber resources because of their inability to accurately determine the exact identity of any one specific person who is utilizing those cyber resources. The systems and methodologies of the present disclosure may be configured to make any cyberspace identity verification test determinations selected from a full spectrum of cyberspace identity verification test determinations as to whether one specific known person and one specific tested person are the same person. At one farthest end of this range is the determination of identity that the one specific tested person and the one specific known person absolutely are the same person. This determination of identity may be utilized to accurately grant only the one specific known person access to his or her own personal and private cyber resources. Since the disclosed cyberspace identity verification test can be configured to utilize unique visual, physical, behavioral or biological characteristics of the one specific known person that can never be replicated by others, then all others may be accurately excluded from ever gaining access to the cyber resources of the one specific known person.

One of the greatest concerns of those who are skilled in the art of providing easy to use, visual, physical, behavioral, or biological-based determinations of identity of a person is that the utilized information that makes up the cyberspace identity of any one specific person may be stolen and then used fraudulently or maliciously. The scalable configurable universal full spectrum cyberspace identity verification test of this disclosure may be configured to make cyberspace identity verification test determinations regarding any one specific person, preferably by utilizing unique visual, physical, behavioral or biological characteristics of the one specific person that can never be replicated by others. In many instances, a unique combination of a number of visual, physical, behavioral or biological characteristics of one specific person that are observed simultaneously or over one or more periods of time may be utilized for accurately making cyberspace identity verification test determinations.

Once again, looking to the future of humanity's use of cyber resources, there may come a time when humanity responsibly utilizes cyber resources as a tool to regularly augment each person's own natural cognitive and observational capabilities.

In order for any one person to achieve the highest attainable levels of benefits from utilization of cyber resources for augmenting his or her own natural cognitive and observational capabilities, it is desirable to first provide the person with a relationship of access to utilized cyber resources that is almost identical to the relationship of access the person has with his or her own mind and senses.

Therefore, it is desirable that personal and private cyber information and resources be configured to where they can, through use of the disclosed cyberspace identity verification test, only be accessed the one specific person who is the proprietary user of those cyber resources. As an example, a person may not want to be hypnotized for the purpose of others using information from the privacy of the person's mind for any reason. The person may also not want any others to gain access to his or her own personal and private cyberspace resources and information, including health records, financial information, geographical locating reports, cyberspace communications of all kinds, and cyberspace interactions of all kinds (including for commerce, education, entertainment, self-help, and so forth). Similarly, a person may not want any others to gain access to all, or any part of, the person's private cyber resources and information post mortem, just as it is with the person's own natural cognitive resources.

Through use of the disclosed cyberspace identity verification test and a point of cyber access computer, it may be possible, as it also is with a person's own natural capabilities, to share any selected portion of the person's own personal and private cyber information or resources with selected others.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed scalable configurable universal full spectrum cyberspace identity verification test has been defined in terms of its preferred and alternative embodiments, those of ordinary skill in the art will understand that numerous other embodiments and applications of the disclosed cyberspace identity verification test will become apparent. Such other embodiments and applications shall be included within the scope and meaning of the disclosure as defined by the appended claims. Moreover, it is to be understood that the above description of the present disclosure is illustrative, and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. A scalable configurable universal full spectrum cyberspace identity verification test, said cyberspace identity verification test comprising:

utilizing (a) at least one computing device, (b) at least one sensor, (c) criteria selected from the group consisting of criteria that may be utilized by said cyberspace identity verification test, (d) selected useful information, (e) selected necessary programming, and (f) any other necessary resource, all of which being configured and utilized for cyberspace identity verification testing of any one specific tested person;

wherein the cyberspace identity verification testing is selected from the group consisting of a full spectrum of types of cyberspace identity verification tests that may be utilized for making a full spectrum of determinations regarding the cyberspace identity of any one specific tested person;

wherein the any one specific tested person is selected from the group consisting of a full spectrum of people who could be tested;

wherein the any other necessary resource is selected from the group consisting of a full spectrum of other resources that may be necessary for a cyberspace identity verification test to utilize;

wherein the cyberspace identity verification test is utilizable under at least one set of identity verification test circumstances selected from the group consisting of a full spectrum of circumstances under which cyberspace identity verification tests may be performed;

wherein the cyberspace identity verification test is utilized for at least one purpose selected from the group consisting of a full spectrum of purposes for which cyberspace identity verification tests may be utilized;

wherein the necessary programming is selected from the group consisting of a full spectrum of programming that may be utilized by said cyberspace identity verification test;

wherein the cyberspace identity verification test utilizes useful information from at least one point in time or from over at least one period of time;

wherein the useful information is selected from the group consisting of a full spectrum of information that may be utilized by said cyberspace identity verification test;

wherein the full spectrum of useful information includes information that was from, or was derived from, at least one sensor observation;

wherein the at least one sensor observation provides useful information regarding at least one aspect of (a) said at least one sensor observation, (b) one specific known person, or (c) one specific tested person, the one specific known person or said one specific tested person being one specific subject of at least one sensor observation;

wherein at least one result from the at least one cyberspace identity verification test regarding the one specific tested person is selected from the group consisting of a full spectrum of cyberspace identity verification test results regarding any one specific tested person;

wherein any one specific tested person is one specific subject of at least one sensor observation;

wherein the at least one aspect of the one specific known person or the one specific tested person is selected from the group consisting of a full spectrum of sensor observable aspects of people who are subjects of sensor observations;

wherein the cyberspace identity verification test utilizes at least one observed characteristic regarding said at least one aspect of (1) the one specific known person, and (2) the one specific tested person;

wherein the at least one observed characteristic being selected from the group consisting of a full spectrum of sensor observable characteristics of people who are subjects of sensor observations;

wherein said cyberspace identity verification test utilizing at least one type of sensor observation selected from the group consisting of (a) visual sensor observations, (b) audible sensor observations, (c) thermal sensor observations, (d) olfactory sensor observations, and (e) tactile sensor observations;

wherein at least one sensor observation having at least one characteristic that may be utilized by said cyberspace identity verification test, said at least one characteristic being selected from the group consisting of a full spectrum of characteristics of sensor observations that may be utilized by said cyberspace identity verification test;

wherein said cyberspace identity verification test utilizing necessary resources and said cyberspace identity verification test being scalable in regard to included necessary resources;

wherein included necessary resources falling at one point in a range of from a minimum to a maximum, wherein at the minimum said cyberspace identity verification test including only the resources that are necessary for providing for the least complex, in regard to included necessary resources, of all cyberspace identity verification test needs for resources, and wherein at the maximum said cyberspace identity verification test including all of the necessary resources for providing for the most complex, in regard to included necessary resources, of all cyberspace identity verification test needs for resources;

wherein said cyberspace identity verification test may be configured for determining or utilizing at least one measure of adequacy of available resources; wherein said cyberspace identity verification test may be configured for determining or utilizing at least one measure of adequacy of available useful information;

wherein said cyberspace identity verification test may be configured for determining or utilizing at least one measure of accuracy of at least one cyberspace identity verification test determination;

wherein said cyberspace identity verification test making at least one duration of cyberspace identity verification test determinations selected from the group consisting of (a) at least one single event cyberspace identity verification test determination regarding any one specific tested person that was made at one specific point in time, (b) at least one set of intermittently provided cyberspace identity verification test determinations regarding any one specific tested person, and (c) at least one set of constantly provided cyberspace identity verification test determinations regarding any one specific tested person;

wherein said cyberspace identity verification test being configurable for testing or verifying the cyberspace identity of any one specific tested person in real time or at any time thereafter; and wherein said cyberspace identity verification test being further configurable for utilizing at least one part of at least one step selected from the group consisting of (a) a first series observation step wherein said cyberspace identity verification test utilizing at least one sensor observation, wherein one specific known person being one specific subject of said at least one sensor observation, wherein said one specific known person having at least one specific sensor observable aspect, said cyberspace identity verification test recognizing at least one characteristic regarding said at least one specific aspect, said at least one recognized characteristic being utilizable by said cyberspace identity verification test in making at least one cyberspace identity verification test determination regarding said one specific known person, said cyberspace identity verification test utilizing at least one designation from said at least one sensor observation or assigning at least one designation representing
  (i) said at least one sensor observation,
  (ii) said at least one sensor observed aspect of said one specific known person, and
  (iii) said at least one sensor observed characteristic regarding said at least one specific observed aspect, wherein said cyberspace identity verification test including said at least one designation, as data, in at least one first series observation record of said one specific known person, (b) a second series observation step wherein said cyberspace identity verification test utilizing at least one sensor observation, wherein one specific tested person being one specific subject of said at least one sensor observation, wherein said one specific tested person having at least one specific sensor observable aspect, said cyberspace identity verification test recognizing at least one characteristic regarding said at least one specific aspect, said at least one recognized characteristic being utilizable by said cyberspace identity verification test in making at least one cyberspace identity verification test determination regarding said one specific tested person, said cyberspace identity verification test utilizing at least one designation from said at least one sensor observation or assigning at least one designation representing
  (i) said at least one sensor observation,
  (ii) said at least one sensor observed aspect of said one specific tested person, and
  (iii) said at least one characteristic regarding said at least one sensor observed aspect, wherein said cyberspace identity verification test including said at least one designation, as data, in at least one second series observation record of said one specific tested person, (c) a processing step wherein at least one part of said data representing said at least one designation from said at least one first series observation step or said at least one second series observation step may be processed in at least one way, said at least one way being selected from the group consisting of a full spectrum of ways said data from said first series observation step or said second series observation step may be processed for utilization by said cyberspace identity verification test; wherein processing of said observation data resulting in creating derived data;

wherein said observation data or said derived data being utilizable for at least one purpose selected from the group consisting of a full spectrum of purposes that said observation data or said derived data may be utilized;

wherein said at least one purpose including said observation data or said derived data being utilized by said cyberspace identity verification test in making at least one selected cyberspace identity verification test determination regarding any one specific tested person, wherein at least one part of said observation data or said derived data may be utilized by said cyberspace identity verification test in at least one part of at least one step selected from the group consisting of at least one processing step, at least one matching step, at least one comparing step and at least one determining step, (d) a matching step wherein said cyberspace identity verification test matching said observation data or said derived data from at least one second series observation record of one specific tested person with comparable observation data or derived data from at least one first series observation record of one specific known person, (e) a comparing step wherein said cyberspace identity verification test comparing observation data or derived data from at least one second series observation record of one specific tested person with comparable observation data or derived data from at least one first series observation record of one specific known person and providing at least one conclusion from said comparing, (f) a determining step wherein said cyberspace identity verification test utilizing at least one member selected from the group consisting of
  (i) at least one part of said at least one conclusion from said at least one comparing step,
  (ii) at least one part of said observation data,
  (iii) at least one part of said derived data, and
  (iv) selected useful information, for making said at least one cyberspace identity verification test determination, and (g) a reporting step wherein said cyberspace identity verification test providing at least one report regarding at least one part of at least one cycle of utilization of said cyberspace identity verification test.

2. The cyberspace identity verification test of claim 1, wherein at least one part of said observation data or said derived data from at least one first series observation record of one specific known person being utilized as said one specific known person's cyberspace identity; and wherein said one specific known person's cyberspace identity being unique to said one specific known person, and at least one part of said observation data or said derived data from at least one first series observation record for any other one specific known person being utilized as a cyberspace identity for said any other one specific other known person, wherein said cyberspace identity being unique to each one specific other known person.

3. The cyberspace identity verification test of claim 1, wherein said cyberspace identity verification test achieving at least one selected attainable percentage of accuracy goal for at least one cyberspace identity verification test determination; and
   wherein said at least one attainable percentage of accuracy goal falls within a range extending from 0% accuracy up to, and including, 100% accuracy.

4. The cyberspace identity verification test of claim 1, wherein said cyberspace identity verification test being utilizable at any possible level of observation participation by any one specific tested person or any one specific known person, said any one specific tested person or said any one specific known person being one specific observation subject of said cyberspace identity verification test; and
   wherein said any possible level of observation participation ranging from said one specific tested person or said one specific known person being sensor observable but not being consciously or otherwise engaged in at least one cyberspace identity verification test observation, to said one specific tested person or said one specific known person being an active participant or consciously engaged participant in at least one cyberspace identity verification test observation.

5. The cyberspace identity verification test of claim 1, wherein said at least one sensor observation occurs over at least one period of time and said at least one sensor observation including at least one observed change that occurs over said at least one period of time to at least one member selected from the group consisting of (a) at least one observable aspect of said sensor observation, (b) at least one observable aspect of any one specific known person who is one specific first series observation subject, and (c) at least one observable aspect of any one specific tested person who is one specific second series observation subject, wherein said cyberspace identity verification test being configurable for utilizing at least one part of said at least one observed change that occur over said at least one period of time, in making at least one cyberspace identity verification test determination.

6. The cyberspace identity verification test of claim 5, wherein said at least one observed change that occurs over said at least one period of time including at least one change to at least one observable aspect of at least one part of at least one feature of one specific person, and wherein said at least one feature of said one specific person is selected from the group consisting of said one specific person's head, face, mouth, eyes, eyebrows, nose, arms, hands, fingers, legs, feet, neck, torso, skin, heart, stomach, intestines, liver, kidneys, lungs, breath, vascular system, brain, spinal cord, neural system, skeleton, blood, and any other feature of any one specific person selected from the group consisting of a full spectrum of features of people where sensor observable changes occur.

7. The cyberspace identity verification test of claim 1, wherein all or part of said observation data, or said derived data from (a) said at least one first series observation record of said one specific known person, or (b) said at least one second series observation record of said one specific tested person, may be included as a part of said useful information.

8. The cyberspace identity verification test of claim 1, wherein at least one cyberspace identity verification test determination including a determination of any indicated percentage of probability that exists of one specific tested person who is the one specific subject of at least one cyberspace identity verification test observation being the same person as one specific known person, wherein said at least one cyberspace identity verification test determination ranging from determining that a 0% probability exists of said one specific tested subject of said cyberspace identity verification test being said one specific known person, through determining any intermediate indicated percentage of probability that exists of said one specific tested subject of said cyberspace identity verification test being said one specific known person, to determining there is a 100% probability that said one specific tested subject of said cyberspace identity verification test absolutely is said one specific known person.

9. The cyberspace identity verification test of claim 1, further comprising:
   a repeating step wherein said cyberspace identity verification test selecting at least one part of at least one first series observation of one specific known person for repetition by one specific tested subject of said cyberspace identity verification test;
   wherein said one specific tested subject of said cyberspace identity verification test being sensor observed performing said at least one repetition;
   wherein said cyberspace identity verification test utilizing at least one designation from the repetition observation or assigning at least one designation representing (a) said at least one sensor observation, (b) said at least one repetition, (c) at least one observable aspect of said one specific tested subject of said cyberspace identity verification test, and (d) at least one characteristic regarding said at least one aspect of said one specific tested subject of said cyberspace identity verification test;
   wherein said cyberspace identity verification test including at least one second series observation record of said one specific tested person's at least one repetition, and wherein said at least one second series observation record including, as data, said at least one designation from said at least one observation or said at least one designation that was assigned by said cyberspace identity verification test to said one specific tested person's repetition.

10. The cyberspace identity verification test of claim 1, wherein said cyberspace identity verification test comprising searching and utilizing available first series observation records of one specific known person until either every selected cyberspace identity verification test determination for the one specific tested person has been completed, or there are no further comparable first series observation records of said one specific known person to search or utilize.

11. The cyberspace identity verification test of claim 1, wherein said cyberspace identity verification test utilizing useful information derived from at least one source other than from at least one member selected from the group consisting of (a) at least one first series observation record of any one specific known person, and (b) at least one second series observation record of any one specific tested person.

12. The cyberspace identity verification test of claim 1, wherein said cyberspace identity verification test, said at least one computing device, said selected criteria, said selected useful information, said selected programming, and said any other necessary resource being utilized for the purpose of making cyberspace identity verification test determinations that are utilized, at least in part, to determine whether to grant, or to deny, one specific tested person, who is the one specific tested subject of at least one cyberspace identity verification test observation, access to at least one part of at least one resource selected from the group consisting of (a) said cyberspace identity verification test (b) at least one resource that is being utilized by said cyberspace identity verification test, and (c) at least one resource that is utilizing said cyberspace identity verification test.

13. The cyberspace identity verification test of claim 1, wherein said cyberspace identity verification test manipulating at least one operation of at least one member selected from the group consisting of (a) resources that are utilized by said cyberspace identity verification test, and (b) said cyberspace identity verification test itself;
   wherein said manipulating providing said cyberspace identity verification test with selection of possible utilizations, wherein said manipulating being utilized for at least one purpose, wherein said at least one purpose for utilizing said manipulating including manipulating for the purpose of aiding in completing at least one selected cyberspace identity verification test determination goal.

14. The cyberspace identity verification test of claim 1, wherein said cyberspace identity verification test further including cyberspace identity verification test history, and wherein said history including at least one history record from said cyberspace identity verification test.

15. The cyberspace identity verification test of claim 1, wherein at least one part of at least one observation record for one specific known person that was derived from at least one source other than at least one first series observation step, being included as at least one part of at least one first series observation record for said one specific known person.

16. The cyberspace identity verification test of claim 1, wherein at least one part of at least one observation record for one specific tested person that was derived from at least one source other than at least one second series observation step, being included as at least one part of at least one second series observation record for said one specific tested person.

17. The cyberspace identity verification test of claim 1, wherein the operations of said cyberspace identity verification test, or any part thereof, being performed in any useable order.

18. The cyberspace identity verification test of claim 1, wherein said cyberspace identity verification test including at least one standard cyberspace identity verification test designation representing at least one part of at least one aspect of at least one operation of said cyberspace identity verification test.

19. A scalable, configurable, universal, full spectrum cyberspace identity verification test, comprising:
   utilizing useful information from at least one point in time or over at least one period of time, said useful information being from a spectrum of information that includes at least one observed characteristic of one specific person who is one specific subject of at least one sensor observation;
   wherein said at least one sensor observation is a type of sensor observation selected from the group consisting of (a) visual sensor observations, (b) audible sensor observations, (c) thermal sensor observations, (d) olfactory sensor observations, and (e) tactile sensor observations;
   wherein the cyberspace identity verification test provides at least one cyberspace identity verification test determination through the utilization of (a) at least one computing device, (b) criteria that may be utilized by said cyberspace identity verification test, (c) selected useful information, and (d) any necessary programming or resources; wherein said cyberspace identity verification test providing at least one duration of cyberspace identity verification test determinations selected from the group consisting of (i) at least one single event cyberspace identity verification test determination that is made at one specific point in time, (ii) at least one set of intermittently made cyberspace identity verification test determinations, and (iii) at least one set of constantly provided cyberspace identity verification test determinations;
   wherein the at least one cyberspace identity verification test determinations are utilized for at least one purpose; wherein said cyberspace identity verification test further comprising utilizing at least one part of at least one step selected from the group consisting of (a) a first series observation step utilizing at least one sensor observation, wherein at least specific known person who is one specific subject of said at least one sensor observation has at least one observable aspect, said cyberspace identity verification test recognizing at least one characteristic regarding at least one observed aspect, said at least one recognized characteristic being utilizable by said cyberspace identity verification test in making at least one selected cyberspace identity verification test determination, said cyberspace identity verification test utilizing at least one designation from said at least one sensor observation or assigning at least one designation representing (i) said at least one sensor observation, (ii) said at least one observed aspect of said one specific known person who is one specific observation subject, and (iii) said at least one recognized characteristic, said cyberspace identity verification test including at least one of said designations, as data, in at least one first series observation record of said one specific known person, (b) a second series observation step utilizing at least one sensor observation;
   wherein one specific tested person who is one specific tested subject of said at least one sensor observation has at least one observable aspect, said cyberspace identity verification test recognizing at least one characteristic regarding at least one observed aspect, said at least one recognized characteristic being utilizable by said cyberspace identity verification test in making at least one selected cyberspace identity verification test determination, said cyberspace identity verification test utilizing at least one designation from said at least one sensor observation or assigning at least one designation representing (i) said at least one sensor observation, (ii) at least one observed aspect regarding said one specific tested person, and (iii) said at least one characteristic regarding said at least one aspect, wherein said cyberspace identity verification test including at least one of said designations, as data, in at least one second series observation record of said one specific tested person, (c) a processing step, wherein at least one designation from said at least one first series observation record or at least one designation from said at least one second series observation record being stored or utilized as data, wherein all or part of said observation data representing said at least one designation from said first series observation step or said second series observation step may be processed in at least one way, said at least one way being selected from the group consisting of a full spectrum of ways that observation data may be processed for utilization by said cyberspace identity verification test, wherein said processing of said observation data resulting in the creation of derived data, wherein said observation data or said derived data may be utilized for at least one purpose selected from the group consisting of a full spectrum of purposes that said observation data or said derived data may be utilized, said at least one purpose including being utilized by said cyberspace identity verification test in making at least one selected cyberspace identity verification test determination, wherein at least one part of said observation data or said derived data may be included as at least one part of said useful information, and at least one part of said observation data or said derived data may be utilized by said cyberspace identity verification test during at least one part of at least one step selected from the group consisting of at least one processing step, at least one matching step, at least one comparing step, and at least one determining step, (d) a matching step matching observation data or derived data regarding one specific tested person who is one specific tested subject of at least one second series observation with comparable observation data or derived data from at least one first series observation record of one specific known person, (e) a comparing step comparing observation data or derived data from at least one second series observation record of one specific tested person with observation data or derived data from at least one comparable first series observation record of one specific known person, and providing at least one conclusion from said comparing, (f) a determining step wherein said cyberspace identity verification test utilizing at least one member selected from the group consisting of (i) said at least one conclusion from said at least one comparing step, (ii) said observation data or said derived data from said first series observation records of one specific known person or said second series observation records of said one specific tested person and (iii) said useful information, for making said at least one cyberspace identity verification test determination, and (g) a reporting step providing at least one selected report regarding at least one part of at least one aspect of at least one part of at least one cycle of utilization of said cyberspace identity verification test.

20. A method for performing a scalable configurable universal full spectrum cyberspace identity verification test on a subject, the method comprising:
performing cyberspace identity verification testing on a subject by utilizing (a) at least one computing device, (b) at least one sensor, (c) criteria selected from the group consisting of criteria that may be utilized by said cyberspace identity verification test, (d) selected useful information, (e) selected necessary programming, and (f) any other necessary resource;
wherein the cyberspace identity verification testing is selected from the group consisting of a full spectrum of types of cyberspace identity verification tests that may be utilized for making a full spectrum of determinations regarding a cyberspace identity of any one specific tested person;
wherein the subject is selected from the group consisting of a full spectrum of people who could be tested;
wherein said any other necessary resource is selected from the group consisting of a full spectrum of other resources that may be necessary for said cyberspace identity verification test to utilize;
wherein said cyberspace identity verification testing is utilizable under at least one set of identity verification test circumstances selected from the group consisting of a full spectrum of circumstances under which cyberspace identity verification testing may be performed;
wherein said cyberspace identity verification testing is utilized for at least one purpose selected from the group consisting of a full spectrum of purposes for which cyberspace identity verification testing may be utilized;
wherein said necessary programming is selected from the group consisting of a full spectrum of programming that may be utilized to perform the cyberspace identity verification testing;
wherein said cyberspace identity verification testing utilizes useful information from at least one point in time or from over at least one period of time;
wherein said useful information is selected from the group consisting of a full spectrum of information that may be utilized by said cyberspace identity verification testing;
wherein said full spectrum of useful information includes information that was from, or was derived from, at least one sensor observation;
wherein said at least one sensor observation provides useful information regarding at least one aspect of (a) said at least one sensor observation, (b) one specific known person, or (c) one specific tested person, said one specific known person or said one specific tested person being one specific subject of at least one sensor observation;
wherein at least one result from at least one cyberspace identity verification testing regarding one specific tested person is selected from the group consisting of a full spectrum of cyberspace identity verification test results regarding any one specific tested person;
wherein any one specific tested person being one specific subject of at least one sensor observation;
wherein said at least one aspect of said one specific known person or said one specific tested person is selected from the group consisting of a full spectrum of sensor observable aspects of people who are subjects of sensor observations;
wherein said cyberspace identity verification test utilizes at least one observed characteristic regarding said at least one aspect of (1) said one specific known person, and (2) said one specific tested person;
wherein said at least one observed characteristic is selected from the group consisting of a full spectrum of sensor observable characteristics of people who are subjects of sensor observations;
wherein said cyberspace identity verification test utilizes at least one type of sensor observation selected from the group consisting of (a) visual sensor observations, (b) audible sensor observations, (c) thermal sensor observations, (d) olfactory sensor observations, and (e) tactile sensor observations;
wherein at least one sensor observation has at least one characteristic that may be utilized by said cyberspace identity verification test, said at least one characteristic being selected from the group consisting of a full spectrum of characteristics of sensor observations that may be utilized by said cyberspace identity verification test;
wherein said cyberspace identity verification test utilizes necessary resources and said cyberspace identity verification test being scalable in regard to included necessary resources;

wherein included necessary resources falling at one point in a range of from a minimum to a maximum, wherein at the minimum said cyberspace identity verification test including only the resources that are necessary for providing for the least complex, in regard to included necessary resources, of all cyberspace identity verification test needs for resources, and wherein at the maximum said cyberspace identity verification test including all of the necessary resources for providing for the most complex, in regard to included necessary resources, of all cyberspace identity verification test needs for resources;

wherein said cyberspace identity verification test may be configured for determining or utilizing at least one measure of adequacy of available resources;

wherein said cyberspace identity verification test may be configured for determining or utilizing at least one measure of adequacy of available useful information;

wherein said cyberspace identity verification test may be configured for determining or utilizing at least one measure of accuracy of at least one cyberspace identity verification test determination;

wherein said cyberspace identity verification test makes at least one duration of cyberspace identity verification test determinations selected from the group consisting of (a) at least one single event cyberspace identity verification test determination regarding any one specific tested person that was made at one specific point in time, (b) at least one set of intermittently provided cyberspace identity verification test determinations regarding any one specific tested person, and (c) at least one set of constantly provided cyberspace identity verification test determinations regarding any one specific tested person;

wherein said cyberspace identity verification test is configurable for testing or verifying the cyberspace identity of any one specific tested person in real time or at any time thereafter; and wherein said cyberspace identity verification test is further configurable for utilizing at least one part of at least one step selected from the group consisting of (a) a first series observation step wherein said cyberspace identity verification test utilizing at least one sensor observation, wherein one specific known person being one specific subject of said at least one sensor observation, wherein said one specific known person having at least one specific sensor observable aspect, said cyberspace identity verification test recognizing at least one characteristic regarding said at least one specific aspect, said at least one recognized characteristic being utilizable by said cyberspace identity verification test in making at least one cyberspace identity verification test determination regarding said one specific known person, said cyberspace identity verification test utilizing at least one designation from said at least one sensor observation or assigning at least one designation representing
  (i) said at least one sensor observation,
  (ii) said at least one sensor observed aspect of said one specific known person, and
  (iii) said at least one sensor observed characteristic regarding said at least one specific observed aspect, wherein said cyberspace identity verification test including said at least one designation, as data, in at least one first series observation record of said one specific known person, (b) a second series observation step wherein said cyberspace identity verification test utilizing at least one sensor observation, wherein one specific tested person being one specific subject of said at least one sensor observation, wherein said one specific tested person having at least one specific sensor observable aspect, said cyberspace identity verification test recognizing at least one characteristic regarding said at least one specific aspect, said at least one recognized characteristic being utilizable by said cyberspace identity verification test in making at least one cyberspace identity verification test determination regarding said one specific tested person, said cyberspace identity verification test utilizing at least one designation from said at least one sensor observation or assigning at least one designation representing
  (i) said at least one sensor observation,
  (ii) said at least one sensor observed aspect of said one specific tested person, and
  (iii) said at least one characteristic regarding said at least one sensor observed aspect, wherein said cyberspace identity verification test including said at least one designation, as data, in at least one second series observation record of said one specific tested person, (c) a processing step wherein at least one part of said data representing said at least one designation from said at least one first series observation step or said at least one second series observation step may be processed in at least one way, said at least one way being selected from the group consisting of a full spectrum of ways said data from said first series observation step or said second series observation step may be processed for utilization by said cyberspace identity verification test; wherein processing of said observation data resulting in creating derived data;

wherein said observation data or said derived data being utilizable for at least one purpose selected from the group consisting of a full spectrum of purposes that said observation data or said derived data may be utilized;

wherein said at least one purpose including said observation data or said derived data being utilized by said cyberspace identity verification test in making at least one selected cyberspace identity verification test determination regarding any one specific tested person, wherein at least one part of said observation data or said derived data may be utilized by said cyberspace identity verification test in at least one part of at least one step selected from the group consisting of at least one processing step, at least one matching step, at least one comparing step and at least one determining step, (d) a matching step wherein said cyberspace identity verification test matching said observation data or said derived data from at least one second series observation record of one specific tested person with comparable observation data or derived data from at least one first series observation record of one specific known person, (e) a comparing step wherein said cyberspace identity verification test comparing observation data or derived data from at least one second series observation record of one specific tested person with comparable observation data or derived data from at least one first series observation record of one specific known person and providing at least one conclusion from said comparing, (f) a determining step wherein said cyberspace identity verification test utilizing at least one member selected from the group consisting of (i) at least one part of said at least one conclusion from said at least one comparing step,
(ii) at least one part of said observation data,
(iii) at least one part of said derived data, and
(iv) selected useful information, for making said at least one cyberspace identity verification test determination, and
  (g) a reporting step wherein said cyberspace identity verification test providing at least one report regarding at least one part of at least one cycle of utilization of said cyberspace identity verification test.

* * * * *